United States Patent
Henager et al.

(10) Patent No.: US 7,200,390 B1
(45) Date of Patent: Apr. 3, 2007

(54) DEVICE SOFTWARE UPDATE TRANSPORT AND DOWNLOAD

(75) Inventors: Justin Henager, Walnut Creek, CA (US); Varsha Clare, Pleasanton, CA (US); Xuming Chen, San Ramon, CA (US)

(73) Assignee: Cellco Partnership, Bedminster, NJ (US)

( * ) Notice: Subject to any disclaimer, the term of this patent is extended or adjusted under 35 U.S.C. 154(b) by 133 days.

(21) Appl. No.: 11/024,485

(22) Filed: Dec. 30, 2004

(51) Int. Cl.
*H04Q 7/20* (2006.01)

(52) U.S. Cl. .................. 455/419; 455/412.1; 455/418; 707/205; 707/203; 709/250

(58) Field of Classification Search ............... 455/419, 455/412.1, 418; 715/542; 707/205, 203; 709/250
See application file for complete search history.

(56) References Cited

U.S. PATENT DOCUMENTS

| | | | |
|---|---|---|---|
| 5,887,254 | A | 3/1999 | Halonen |
| 6,023,620 | A | 2/2000 | Hansson |
| 6,029,065 | A | 2/2000 | Shah |
| 6,138,009 | A | 10/2000 | Birgerson |
| 6,370,389 | B1 | 4/2002 | Isomursu et al. |
| 6,549,770 | B1 | 4/2003 | Marran |
| 6,587,684 | B1 | 7/2003 | Hsu et al. |
| 6,622,017 | B1 | 9/2003 | Hoffman |
| 2004/0010628 | A1* | 1/2004 | Gillam et al. ............... 709/250 |
| 2004/0098361 | A1* | 5/2004 | Peng ............................ 707/1 |
| 2004/0098421 | A1* | 5/2004 | Peng ......................... 707/203 |
| 2004/0098427 | A1* | 5/2004 | Peng ......................... 707/205 |
| 2005/0193336 | A1* | 9/2005 | Fux et al. ................... 715/542 |
| 2005/0204351 | A1* | 9/2005 | Jiang et al. ................ 717/162 |

* cited by examiner

*Primary Examiner*—Danh Cong Le
(74) *Attorney, Agent, or Firm*—McDermott Will & Emery LLP

(57) ABSTRACT

A mobile station update client facilitates downloading of updated software. This client interacts through a data communication client, using a standard interface. The data client wakes up the update client, in response to a notification from a download server. The update client interacts with the server, to identify resident software for checking against update(s) available from the server. The server does not need to be pre-provisioned with information as to the software or firmware in the mobile station, as this data can be provided by the update client. Also, there is no need for transmission of sensitive subscriber information over the air once a connection is established, because the download client provides the minimal data needed to facilitate the checking and updating of the software. An update is downloaded and stored in dedicated memory in the mobile station. The update client installs the updated software and activates that software for future use.

12 Claims, 13 Drawing Sheets

Device Software Download Network Architecture Call Flow (Network Initiated)

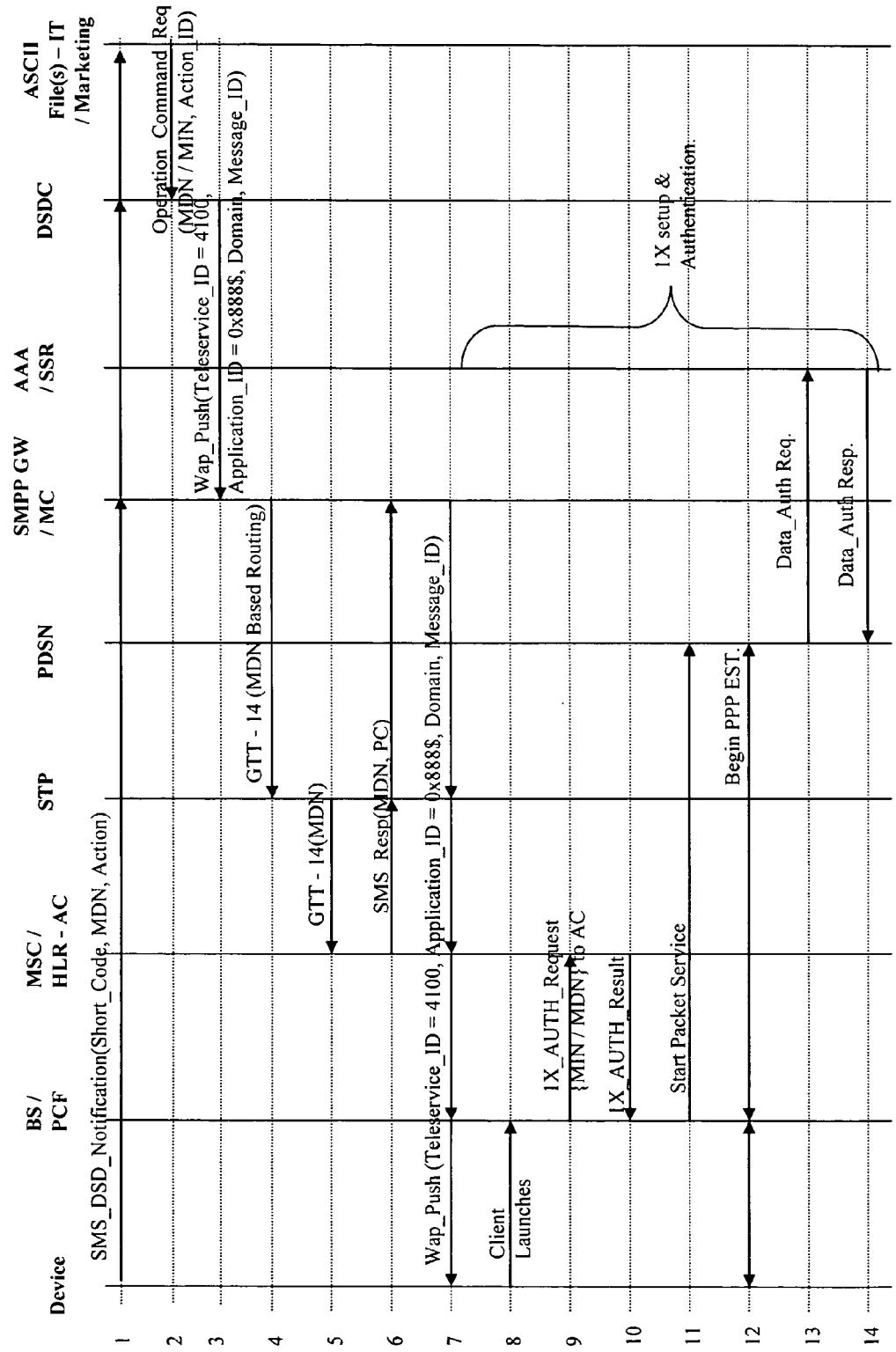

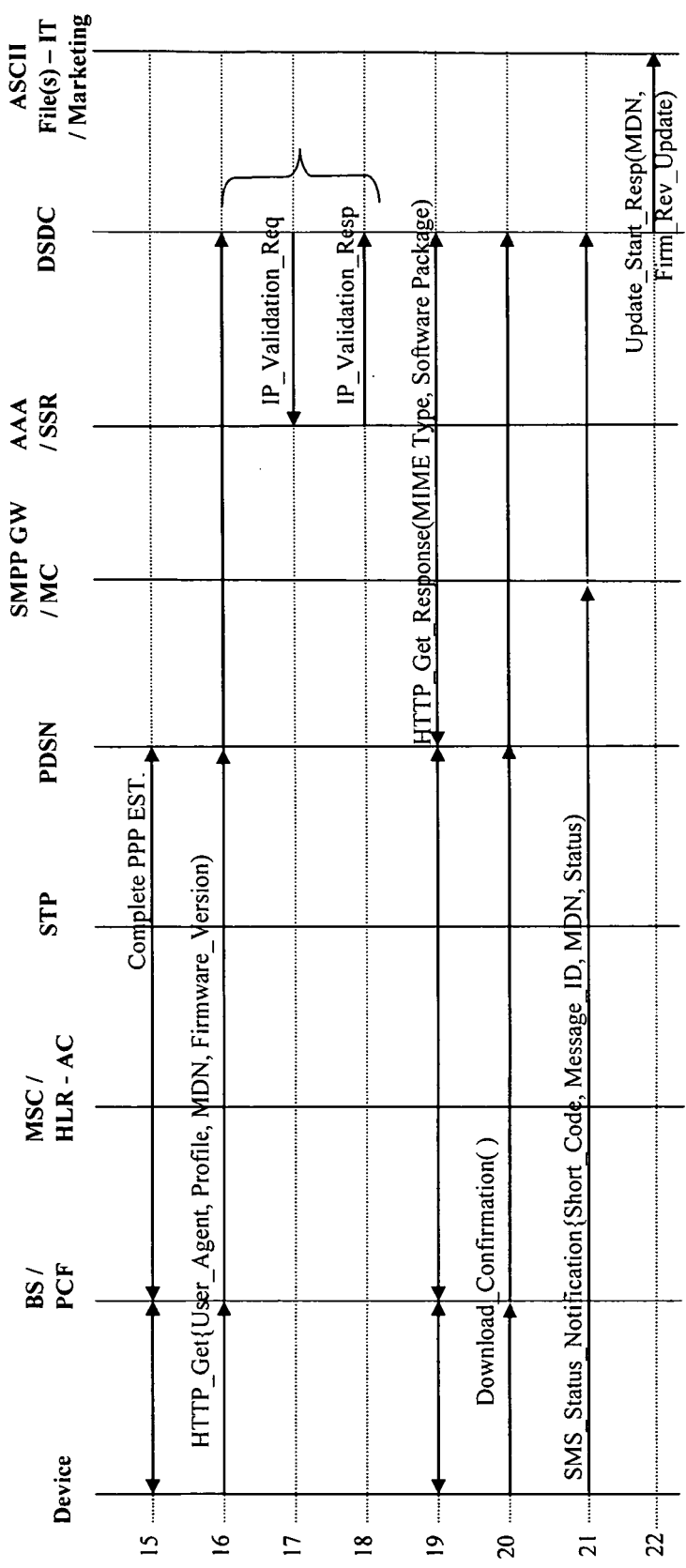

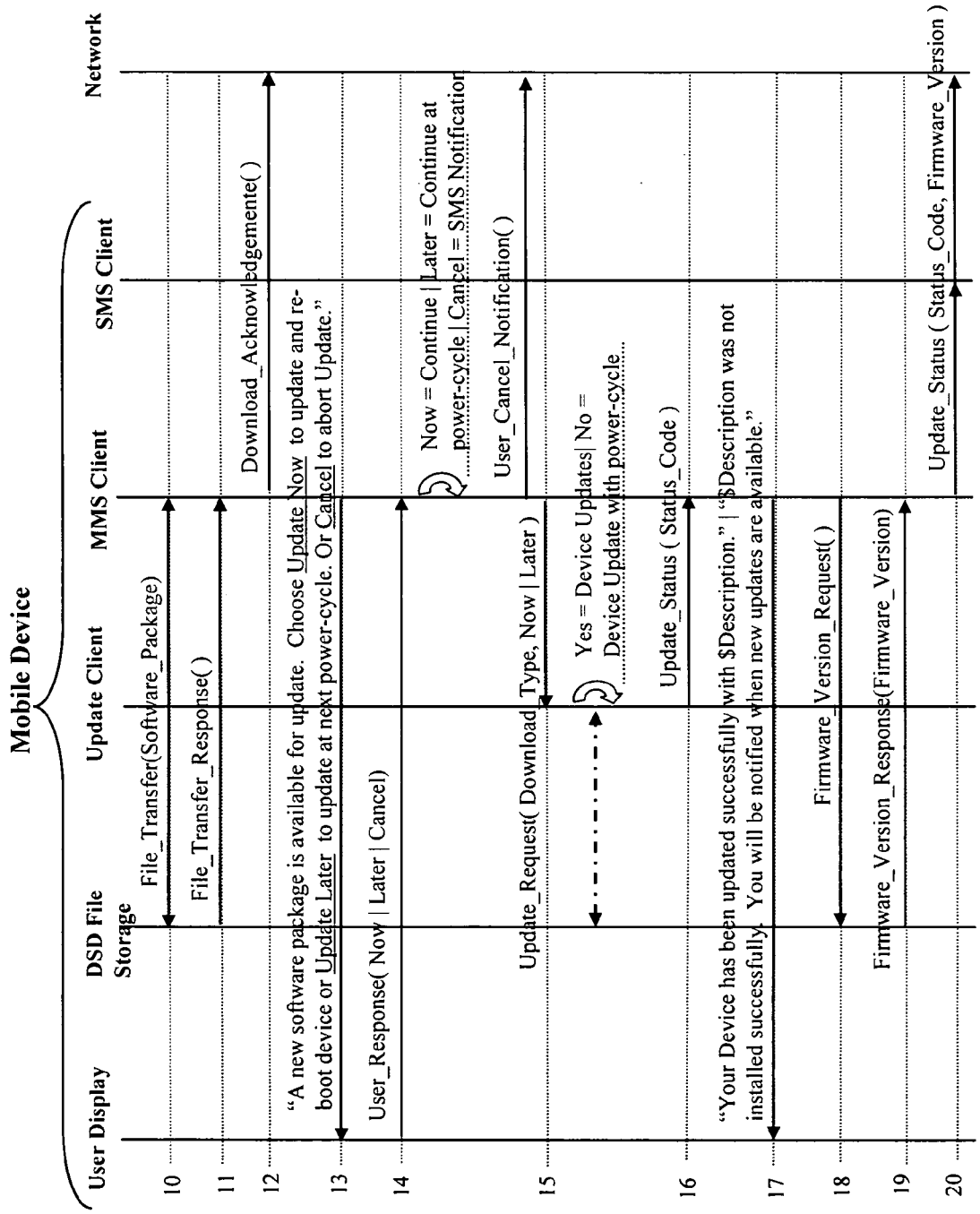

DEVICE SOFTWARE UPDATE TRANSPORT AND DOWNLOAD

TECHNICAL FIELD

The present subject matter relates to techniques and equipment to download device software updates (DSUP), to mobile stations (MS) over the air.

BACKGROUND

In recent years, cellular or personal communication service type mobile telephones have emerged as a must-have appliance among mobile professionals and consumers alike, growing in popularity every year since they were first introduced. The public has come to accept that mobile service enhances business and personal communications and may contribute to personal security. Consequently, mobile communication is becoming increasingly popular, particularly for voice grade telephone services, and more recently for data communication services.

In mobile networks, the users' mobile stations today are relatively 'smart' programmable devices, offering a wide range of communication features. Many such devices are also programmable to run other applications of interest to the users. Activation of service, programming of service features and installation of user-desired applications all entail loading software into the mobile station. For convenience, most such software loading of programming to a mobile station is performed by transmission via the wireless link, that is to say, over-the-air. A variety of techniques have been proposed for over-the-air programming of software into mobile stations.

U.S. Pat. No. 6,622,017 to Hoffman entitled "Over-the-air programming of wireless terminal features" discloses a technique for distributing user selected feature software to mobile terminal devices. A terminal user selects a desired feature or set of features and contacts a service provider. The provider's equipment downloads software programming corresponding to the desired feature into the memory of the terminal device. The software takes the form of a plug-in module, written to the program interface specification of the core software of the terminal device. When loaded into memory and interfaced through the core software, the module allows the terminal device to implement the desired feature. Features can be added, upgraded or replaced at any time by downloading new feature modules into the memory.

U.S. Pat. No. 6,587,684 to Hsu et al. entitled "Digital wireless telephone system for downloading software to a digital telephone using wireless data link protocol" teaches downloading software for digital telephone services to a mobile station, using a client browser. The digital telephone initiates a data call to an interworking unit via a digital wireless telephone network, using a prescribed wireless data protocol such as IS-95A. The interworking unit recovers the payload of the wireless data packets to establish a two-way data link with the digital telephone. The interworking unit sends data messages to a destination server across a second two-way data link in a packet switched network to establish a two way session between the digital telephone and the destination server. The user of the digital telephone can thus communicate with the server via a two-way application-layer session using hypertext-based messaging. The digital telephone can navigate between different servers on the packet switched network for activation of different digital telephone services, and for downloading new software or updating existing software related to the digital telephone services.

U.S. Pat. No. 6,549,770 to Marran entitled "Over the air programming and/or service activation" discloses techniques for managing wireless digital communications subscribers mobile digital cellular telephones. The wireless network has the capability to download programming data over-the-air directly to the subscriber's mobile device, which communicates with an intelligent system that processes complex inputs, discovers problems from the complex inputs, and formulates individualized solutions for discovered problems. The intelligent system also searches the wireless digital communications network for, and retrieves, the necessary data for solving discovered problems; triggers the wireless digital communications network to establish a data link with a subscriber s mobile, digital device; and then directly downloads the necessary data to the subscriber s mobile device over-the-air.

U.S. Pat. No. 5,887,254 to Halonen entitled "Methods and apparatus for updating the software of a mobile terminal using the air interface" discloses a technique for downloading and storing software into a mobile telephone. The download may be initiated after a notice of new software availability from the network. When a new or revised operating program is available the mobile terminal receives a message from the network. Subsequently, the network begins transmitting the new or revised operating program to the mobile terminal, as code blocks. The code blocks can be sent using Short Message Service (SMS) messages or using System Operator Code (SOC) signaling. At the mobile terminal, the received code blocks are passed through the DSP to the MCU, which stores the received code blocks into a memory location for the new program. After the new or revised program is completely received, the MCU changes the Active Memory flag to designate that memory location as the Active memory and a memory location storing the old program as the Idle memory. The MCU then resets itself to an initial state and begins executing code from the memory.

U.S. Pat. No. 6,023,620 Hansson entitled "Method for downloading control software to a cellular telephone" also discloses a push technique for notifying a user and downloading software upgrades. When a new version of the software is available, the update server processor transmits a message via the cellular telephone network to the cellular telephone, offering the option to download the new version of the software. The subscriber is instructed to depress a specific key or keys to initiate the downloading process. The cellular telephone transmits an acceptance code and the telephone number of the cellular telephone to the update service processor. The update server processor receives the acceptance code and telephone number, and when it is ready to download the software, transmits a command instructing the cellular telephone to prepare to receive the new software. The cellular telephone responds to the command by transmitting an acknowledgment message to the update server processor and waits for a data transfer to the cellular telephone. The update server processor transmits the new version of the software to the cellular telephone, and the controller loads the new software into previously inactive memory.

U.S. Pat. No. 6,029,065 to Shah discloses a remote feature code programming technique. A base station determines what features a mobile station will support, and then downloads information to the mobile station to notify the user of the network features that are available. The base station provides the feature codes that are required to access the network features. The mobile station user may select a desired feature, either by selecting a menu location or by entering a familiar sequence of keystrokes. The mobile station converts the selection values into a feature code corresponding to the selected feature, to effectively activate the user-selected feature.

U.S. Pat. No. 6,138,009 to Birgerson discloses a technique for customizing wireless communication units. Software relating to the wireless communication units is provided in a number of servers accessible over a global data communications network, such as the Internet. The disclosed system downloads user selected applications to the mobile station from the Internet. Specifically, Birgerson teaches sending a query through the Internet and downloading software via a File Transfer Protocol (FTP) or Castenet type channel monitoring in combination with an Application Download Protocol (ADP).

U.S. Pat. No. 6,370,389 to Isomursu et al. entitled "Communication network terminal supporting a plurality of applications" discloses a technique for using short message service (SMS) communications to send data messages to a mobile station to activate, and in some cases update, applications in the mobile station. The system offers a menu application, with updating. Apparently, the user can initiate SMS communication to request a download, and a server downloads the application data to the station. The text also suggests use of packet radio service such as the GSM/GPRS (General Packet Radio Service).

Where the software for the mobiles station changes from time to time, it is necessary to use one of these techniques to download updates. Actual implementations of these and other previous techniques for downloading device software updates to wireless mobile stations have relied on proprietary solutions in which the subscriber information is maintained within the software download server. One disadvantage of these solutions is the need for pre-provisioning of the subscriber information by means of the carrier's Billing System or a boot-strap process, which requires the mobile station to establish a connection to the download server and download subscriber information prior to use of the actual software. A second disadvantage is need for sensitive subscriber information such as ESN, MIN, etc. to be passed over the air once a connection is established for the software update downloading. Hence, a need exists for a software update download solution that obviates the need for pre-provisioning and/or does not require sensitive subscriber information to be passed over the air once a download connection is established.

SUMMARY

The concepts disclosed herein alleviate one or more of the above noted problems downloading software updates to mobile stations by using an update client having an interface through a data communication client implemented in the mobile station. The update client handles various functions involved in the download and updating of the software within the station.

A method is provided, for example, for downloading updated software to a mobile station over-the-air through a wireless mobile communication network. The method involves an identification of the mobile station from among stations served through the wireless mobile communication network. A push notification is sent through the wireless mobile communication network, to a data communication client resident in the mobile station. An update client resident in the mobile station is activated in response to the push notification; and a data communication session is initiated, from the data communication client resident in the mobile station, through the wireless mobile communication network, for example, to a server that is potentially the source of a software update. The update client sends a software identifier, typically an application identifier indicative of software currently resident in the mobile station, via the data communication session. The method then entails downloading updated software for the mobile station to the data communication client resident in the mobile station, via the data communication session. When the downloading is complete, the downloaded updated software is transferred to the update client for installation and activation thereof within the mobile station.

The exemplary techniques use a dedicated area in memory of the mobile station for a downloading memory. Hence, the transferring of the updated software entails storing received updated software in the location in memory dedicated to software updating. The update client then installs the downloaded updated software from the dedicated location in memory.

Examples of the data communication client include a mobile multimedia service (MMS) client, a short message service (SMS) client and a wireless access protocol (WAP) client. The data client may also be a proprietary client. The update client interacts with and through the data communication client, for example, via a standard software interface, much like any other application on the mobile station that uses data communication services.

The software update techniques are applicable in a wide range of wireless networks that support data communications, including those that support broadband packet data communication. An example of such a network is discussed, which utilizes 1x wireless technology, although the principles are applicable to other technologies, including those of an EVDO type network.

The exemplary processes offer the ability to download a DSUP without pre-provisioning, and prior knowledge of subscriber information, such as the current state of the software/firmware in the subscriber's mobile station. The download service can discover the state of the software/firmware in the mobile station as part of the communication with the mobile station. The exemplary DSUP downloading techniques provide the ability to have a Mobile Originated or Mobile Terminated "Update." Also, there is no need to pass sensitive subscriber information over the air, and relatively few data transactions are needed before downloading the DSUP. The techniques maintain minimal overhead messaging by extracting or obtaining minimal OEM Manufacturer specified data. With the use of a specific Application ID and a dedicated "Device memory allocation" for the "Update Package," as in several examples discussed below, the DSUP client can interact with any proprietary or non-proprietary associated regular data communication client. As such, the download service is not limited to one proprietary solution.

All mobile stations may be targeted for DSUP without pre-provisioning or prior knowledge of mobile station parameters, and fewer data transactions are needed prior to the download. Additional information can be passed to the mobile station, such as an encryption key, using single or multiple file signatures to secure the content transfer to the mobile station. Multiple customized MIME types and Wireless Application Protocol (WAP) application ID are used for transferring different content and triggering different application actions on mobile stations. A 'confirmation of action executed' message may be sent back to the DSUP system via SMS, after a successful software upgrade. The DSUP transport uses a notification-push technique, which allows the user to manually permit and confirm download process.

These functions are not limited to a single physical device. They can be extended over multiple physical manifestations of the functions.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present teachings may be realized and attained by means of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitations. In the figures, like reference numerals refer to the same or similar elements.

FIGS. 4a and 4b together form a call flow diagram, illustrating the signal flow in a user initiated device software download operation, from the perspective of the network architecture.

FIGS. 9a and 9b together form a call flow diagram, illustrating the signal flow in a user initiated device software download operation, from the perspective of the device architecture.

DETAILED DESCRIPTION

In the following detailed description, numerous specific details are set forth by way of examples in order to provide a thorough understanding of the relevant teachings. However, it should be apparent to those skilled in the art that the present teachings may be practiced without exemplary details. In other instances, well known methods, procedures, components, and circuitry have been described at a relatively high-level, without detail, in order to avoid unnecessarily obscuring aspects of the present concepts.

The various software downloading techniques and systems disclosed herein rely on an update client for downloading software updates, sometimes referred to as a device software update or 'DSU' client. In the mobile station, this client interfaces to and interacts through a native data communication client, such as an SMS client, a WAP client, an MMS client or a proprietary data client. In a download operation, a server sends a push notification to the data client, which wakes up the downloading client. The downloading client interacts with the server, for example, to identify an application to enable a comparison of current firmware in the station against available updates loaded on the server. The server does not need to be pre-provisioned with information as to the software or firmware in the mobile station, as this data can be provided by the update client. Also, there is no need for transmission of sensitive subscriber information over the air once a connection is established, because the download client transmits the minimal OEM Manufacturer specified data needed to facilitate the checking and updating of the software or firmware. The update is downloaded, and may be stored in dedicated memory in the mobile station, for transfer to the update client. The update client installs the update software and activates that software for future use, typically by rebooting the mobile station. Reference now is made in detail to the examples illustrated in the accompanying drawings and discussed below.

Figure 1:
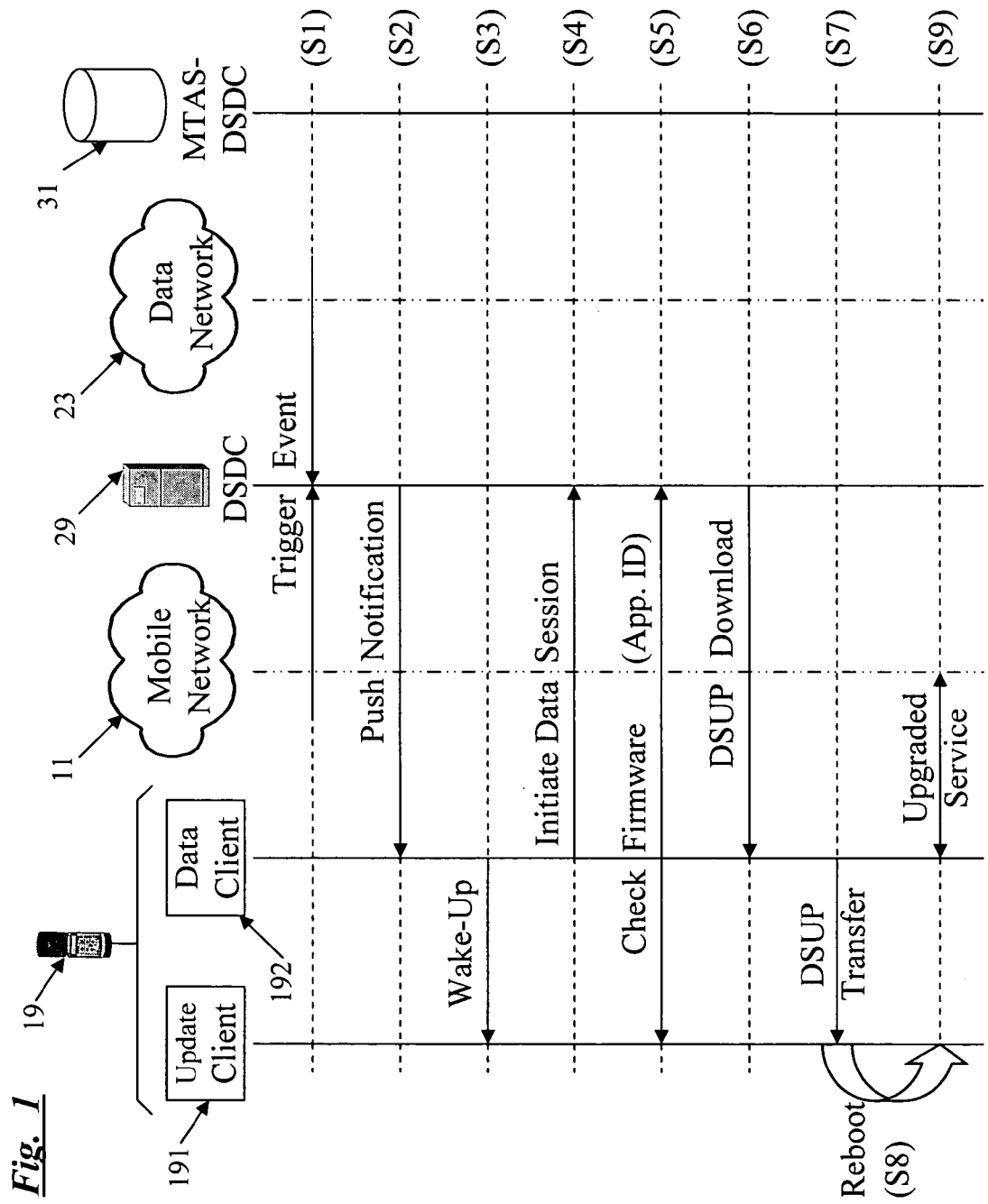
FIG. 1 is a simplified call flow diagram, useful in understanding the software update downloading techniques disclosed herein.

FIG. 1 is a simplified flow chart representing the signal flow involved in a DSUP download operation through a wireless communication network. The elements involved in the communication include a mobile network 11, which provides mobile wireless data service(s) to a mobile station 19 over an air link using a standard protocol. The mobile station 19 includes application software or firmware, including at least two client routines represented by the update client 191 and the data client 192. The data client is a resident data communications client, such as WAP client, an SMS client and/or an MMS client, enabling various push and pull type data communications. The client 192 interacts through the lower level firmware and hardware of the mobile station 19 to execute data communications via the mobile network 11. The data communication client 192 may be standard or proprietary. In either case, the client 192 provides a standard interface by which other applications running on the mobile station 19 may send and receive data via the client 192 and the packet communications services of the network 11. Much like any data application (e.g. e-mail or browser) running on the station 19, the update client 191 interacts through the data communication client 192 to perform certain device-side functions, in this case, for the DSUP download operation.

For purposes of this discussion, the exemplary elements involved in the communication also include a Device Software Download Center (DSDC) 29. The DSDC 29 is implemented on a standard server platform having an appropriate interface connection to the mobile network 11 for data communications. The DSDC 29 stores the software/firmware loads for the various types of mobile stations 19 operating on the wireless network 11 as well as data necessary to facilitate DSUP type downloading to the individual stations 19. The DSDC runs a server program to enable data communication and interactions with the mobile stations in accord with the DSUP procedures, such as those outlined herein.

In the call or signal flow of FIG. 1, an initial event triggers a DSUP download operation by the DSDC 29, at step S1. The event identifies the particular mobile station that will receive the download. The event may entail receipt of a message identifying the particular mobile station 19. The DSDC 29 may receive the message from the mobile station 19 via the mobile network 11, for example, as part of an interactive process in which the station user selects a download or accepts an offer to download an available firmware update for the particular station model. Alternatively, the DSDC 29 may receive an instruction from a provisioning system or other systems, typically operated by the carrier, instructing the DSDC to offer to or forcibly download a new upgrade to one mobile station 19 or to a number of such stations of the same make/model. In the example, this alternate message arrives through a data network 23 from a Mobile Telephone Administration system or "MTAS." An MTAS is a computer system that the carrier uses to provide service provisioning data. Of note for purposes of the discussion of the DSUP downloading, the carrier utilizes an MTAS 31 to provision and provide instruction to the DSUP download center DSDC 29. The MTAS may be substantially dedicated to the DSUP service, although typically, the carrier will use the one MTAS to perform DSUP related functions as well as a number of other provisioning services.

In response to the trigger event (in response to S1), the DSDC 29 transmits a push notification message through the mobile network 11 to the identified mobile station 19 at S2. The push notification, for example, may use an SMS push procedure, a WAP IP push procedure or the like. The push notification identifies the update client 191 as the target application, and the notification provides any information needed to allow the data client 192 to initiate a data communication session back to the DSDC 29. Hence, upon receipt of the push notification, the data client 192 wakes-up the update client (S3) and causes the mobile station 19 to communicate through the mobile network 11 to initiate a data communication session with the DSDC 29 (S4).

Via the data session, the DSDC 29 communicates with the update client routine 191, to provide to the DSDC the minimal OEM Manufacturer specified data needed to facilitate the DSUP download to this station 19. For example, the update client provides the Application ID and any other specific data to check the station's current firmware load in comparison to the latest firmware update available for the particular model of station 19 (S5).

If no download is necessary, e.g. because the station 19 is already loaded with the latest firmware update, then processing may terminate at this point. However, for discussion purposes, it is assumed that a new update is available and processing continues with the download of the DSUP software/firmware update, from the DSDC 29 to the mobile station 19 (at step S6).

The data client 192 transfers (at S7) the downloaded DSUP update to the update client 191, which stores the download in a portion of the memory of the mobile station 19 dedicated to the DSUP download operation. Upon successful completion of the download, transfer and storage, the update client causes the mobile station to reboot (S8). After the reboot, the new firmware load controls operation of the mobile station 19 through the mobile network 11. When the station 19 restarts, it registers with the network 11 and resumes service, and that service (at S9) is based at least in part on the upgraded software/firmware the station received as a result of the DSUP download operation.

In this example, the only information needed by the DSDC to start the process was the initial identification of the particular mobile station in the trigger event (S 1). It was not necessary to pre-provision the DSDC 29 with extensive information about the make/model and software load currently in the station 19. Also, the amount of information communicated between the station 19 and the DSDC 29 was the minimal amount needed to facilitate the firmware check and then download the appropriate upgrade. For example, there was no need to communicate sensitive information. The download can be Mobile Originated or Mobile Terminated (Network Originated). Also, the use of a specific Application ID and a dedicated "Device memory allocation" for the "Update Package" allows the download client 191 to interact through any proprietary or non-proprietary associated regular data communication client 192.

More specific examples of the DSUP download operations will be discussed below. Although the elements of the wireless networks are generally known, to insure a full understanding of the examples, it may be helpful to consider the general structure and operation of an example of one such network before going into detail with regard to the more detailed DSUP download operations in that exemplary network.

The present concepts are applicable to a variety of different wireless technologies supporting packet data communications services, such as GSM/GPRS, UMTS, EVDO, etc., as may be implemented in a variety of different frequency bands. A logical evolution of IS-95A type digital wireless communications toward a 3G (third generation) implementation involves an upgrade of the digital technology toward cdma2000-1x or 1x for short. The attendant Radio Transmission Technology (1xRTT) may use a 1.25 MHz CDMA bandwidth. Although there are many benefits associated with such 1x systems, the two most significant benefits are voice capacity increase and high-speed packet data. A 1xRTT CDMA network implementation provides the ability for mobile professionals with their laptop PCs, Pocket PCs, Palm, and other wireless devices to access the Internet, their email, or corporate intranets in a wireless environment at higher data rates with broader coverage for a richer experience. Hence, the examples provide the mobile communications services with associated DSUP type software downloading in the context of 1xRTT type network equipment.

The communication network 11 provides mobile voice telephone communications as well as packet data services, for numerous mobile stations. For purposes of later discussion, two mobile stations 19 appear in the drawing; each operated by a different user. The stations 19 represent the general class of mobile stations that operate via the public cellular network 11.

The network 11 enables users of the mobile stations to initiate and receive telephone calls to each other as well as through the public switched telephone network (PSTN) 21, for example for communications with landline telephone devices 23. The network 11 also enables users of the mobile stations 19 to initiate and receive various data communications, for example through a WAN 25, to the public data network referred to as the Internet 26. Such data communications allow users of the mobile stations to send or receive data to or from other digital devices (represented by way of example by a PC and a server) that otherwise have access to the Internet 26 or other network coupled to the WAN 25. The data communications typically provide transport for the various information in Internet Protocol (IP) packets, for routing or packet switching communications through Intranets (not shown) or through the Internet 26. This enables communications with a variety of other data devices, such as servers, hosts and personal computers coupled to the Internet. The network 11 provides the various wireless communication services in accord with a digital radio protocol, although for voice telephone services, the network may also support a legacy analog protocol.

The mobile stations 19 may take many forms. For example, some mobile stations may be enhanced mobile telephone stations with display and user input capabilities to support certain text and image communications, for example, for e-mail and web browsing applications. Today, such enhanced mobile telephones typically take the form of portable handsets, although they may be implemented in other form factors. Other mobile stations may comprise portable digital assistants (PDAs) with built-in wireless communication capabilities and possibly a voice interface. As another alternative, a wireless device such as network interface card or even a mobile telephone having data communication capabilities may be connected to or integrated into a portable computing device, such as a handheld or laptop type computer.

In the example, the mobile wireless communication network 11 is a cellular type network. Physical elements of a radio access network (RAN) portion thereof include a number of base stations represented in the example by the base transceiver systems (BTS) 17, which communicate via antennae and the air-link with the mobile stations 19, when within range. A base station typically includes a BTS 17 coupled to several antennae mounted on a radio tower within a coverage area often referred to as a "cell." The BTS 17 is the part of the radio network that sends and receives RF signals to/from the mobile stations 19 that the base station currently serves.

A typical current example of the network 11 also includes a number of radio access network switches. The drawing shows one such switch 15. The switches 15 typically are modern versions of mobile switching centers (MSCs) or Mobile Telephone Switching Offices (MTSOs), which support both cellular voice and packet data services. Each MSC switch 15 connects through trunk circuits to a number of the BTS base station transceivers 17, which the respective switch serves and controls.

The carrier operating the wireless network 11 also operates a home location register (HLR) 16 that stores subscriber profiles and related call processing control information for each of that carrier's wireless subscribers and their associated mobile stations 19. The HLR 16 may reside in the home MSC, however, in the example, the HLR 16 resides in a centralized node sometimes referred to as a service control point (SCP). The SCP communicates with the MSCs 15 via data links and one or more signaling transfer points (STPs) 27 of an out-of-band signaling system, typically, a signaling system 7 (SS7) network. As recognized in the art, the HLR 16 stores for each mobile subscriber the subscriber's mobile telephone number, the mobile identification number, and information specifying the wireless services subscribed to by the mobile subscriber, such as numeric paging or text-based paging, data communication services multiple alerting, etc.

The BTS 17 at a base station assigns and reassigns channels to the mobile stations 19 that it serves and monitors the signal levels to recommend hand-offs to other base stations. The network 11 typically includes a base station controller (BSC) functionality 18 that controls the functions of a number of base stations and helps to manage how calls made by each mobile station are transferred (or "handed-off") from one serving base station to another. Each wireless network equipment vender implements this function differently. Some vendors have a physical entity, which they call a BSC 18 as shown, while other vendors include this functionality as part of their MSC switch 15.

As noted, it is envisioned that the DSUP download techniques may be implemented in a wide range of mobile network technologies, including broadband network technologies, such as EVDO. For discussion purposes, the example takes the form of a 1xRTT type network.

In a 1xRTT network of the type generally shown in FIG. 1, the radio control functions of the BSC 18 are enhanced to provide added control adapted specifically to support packet data communications over the wireless air-link interface through the base station BTS(s) 17 controlled by the particular BSC 18 or by MSC switch 15. For example, a BSC functionality 18 will receive a packet data service profile of each mobile station it services, and the BSC 18 will use that profile to control certain handoff operations as well as to interact with the packet routing functionality provided through the associated PDSN 20, discussed below.

A 1xRTT network also includes an element programmed to implement a packet control function (PCF). Although this function may be implemented in other network elements, in the illustrated example, this function is associated with the Base Station Control (BSC) 18 of the public cellular network 11.

The network 11 also includes a number of Packet Data Serving Nodes or "PDSNs." The PDSN 20 is a fixed network element introduced in the architecture for 3G networks, to support packet-switched data services. The interface between a cdma2000-1x radio access network and a PDSN is called the R-P Interface, for example, between the PDSN 20 and the BSC/PCF 18.

Each PDSN 20 establishes, maintains and terminates logical links to the associated portion of the radio access network 11, across the respective R-P interface. The PDSNs 20 also support point to point (PPP) sessions with the mobile stations 19. The PDSNs 20 provide the packet routing function from the respective radio network to/from other packet-switched networks, represented by network 25, in the drawing.

In the public network 11, the PDSN 20 initiates Authentication, Authorization and Accounting (AAA) communications to an AAA server 24, for example, via the internal packet network (WAN) 25, for each mobile station client seeking packet communications. The server 24 provides Authentication, Authorization, and Accounting (AAA) functions for packet data calls in a cdma2000-1x network, such as the network 11. Such servers authorize service subscriptions, service profiles, and customized services. The AAA server 24 also performs a variety of accounting functions, including starting an accounting record, maintaining an interim accounting record, and stopping an accounting record, for each packet data communication service session. The PDSN 20 receives service parameters for the mobile station, now operating as a mobile client, from the AAA server 24. The PDSN 20 also collects usage data for accounting purposes, which it relays to the AAA server 24.

In operation, packet services of the mobile stations are homed to one PDSN 20, much the same way as they are homed to one serving area, such as an area served by a particular MSC 15 and that PDSN serves as the stations' Home Agent (HA). When roaming, another PDSN 20 serves as a Foreign Agent, in a mobile IP service implementation. The Home Agent (HA) ensures smooth seamless hand-off among various PDSNs 20.

The PCF function converts the radio protocols into packet protocols to allow the associated PDSN to route packets in standard packet protocols via the internal networks links. Hence, in the example, the PCF processor in the BTS 17 relays packets and provides the necessary protocol conversions between radio communications via the base station and the PDSN 20. In some implementations, the MSC 15 provides packet switched communications to/from the PSDN 20. The PCF operations may provide buffering of packets, if available resources allocated to a mobile station are temporarily overloaded by a packet flow.

Hence, the illustrated network 11 in addition to normal cellular type telephone services, supports a range of packet data services. The packet data communications can support traditional data applications, such as browsing the Internet and e-mail communications to/from remote computers such as a server or a personal computer. Some of these services, such as browsing, use a "pull" model in which the station requests and receives desired information. Other services, such as e-mail message receipt notification, entail a data "push" operation in which a data source initiates the transmission (pushes) the information out to the recipient mobile station. In wireless networks, a push communication often relies on a notice transmission which activates a routine in the mobile station to initiate a session from the mobile station that emulates a pull model communication, albeit to obtain the data intended to be pushed out to the mobile station. For purposes of the present discussion, the packet data communications through the network 11 also enable the DSUP download operations. The DSUP download operations rely in part on such an implementation of a push communication.

In the example, the PDSN 20 supports Mobile IP (MIP) addressing for dynamic and static address services. Of course, the wireless network 11 may support other address administration services for mobile stations, such as Simple IP service. Mobile IP or "MIP" is a service in which the user s mobile station 19 is assigned an IP address from a "home" network (e.g., a home agent (HA)). With MIP service, the assigned IP address does not change as the mobile station 19 changes its point of attachment to the network 11 (e.g. by roaming to a new provider network or by roaming across a PDSN boundary). If dynamically assigned, the IP address remains assigned to the particular mobile station 19 until that station logs-off, the station is inactive for longer than some set period, or the data session is otherwise terminated.

The network 11 also includes a service control point a signal transfer point (STP) 27 coupled to other elements of the network and to elements of the PSTN 21 through signaling system no. 7 (SS7) link sets. Although only one is shown for convenience, STPs typically are implemented in mated pairs and interconnect to other pairs of STPs. The STPs and the links thereto provide a signaling network, for use in managing call traffic through the telecommunications networks, e.g. networks 11 and 21.

In addition to links to switches or 'offices' of the networks, the STP 27 provides signaling links to control nodes, such as Service Control Points and to other special service components of the network. Of note for purposes of the present discussion, the STP 27 provides a signaling communication link to an SMSC 28. The SMSC 28 also connects to an IP network, in this case the WAN 25, for receiving and possibly sending messages in IP packet format. As discussed more below, the push notification for DSUP download may utilize an SMS communication, via the SMSC 28.

Wireless carriers originally developed the short message service (SMS) to transmit text messages for display on the mobile stations 19. The SMSC 28 is a standard messaging computer used in cellular networks today to offer SMS services to cellular customers. The SMSC 28 receives IP packet communications containing messages, such as e-mail, intended for transmission to mobile stations 19 and forwards them to the appropriate MSC 15 via the STP 27 and the SS7 signaling link sets. The MSC 15, in turn, transmits each SMS message over a signaling channel of the radio access network to the intended mobile station 19. Of note for purposes of the present discussion, the SMS message transmission technique has been adapted to send notifications to mobile stations of push data communications, in response to which, the mobile stations initiate data sessions to obtain the pushed data using procedures that otherwise correspond to push type data services. Those skilled in the art will recognize that other push notification techniques, such as a WAP IP push, could be used.

In the example, the network 11 also includes a DSDC 29, implemented as a server platform coupled for IP communication via the WAN 25. As noted in the discussion of FIG. 1, the DSDC 29 stores the software/firmware loads for the various types of mobile stations 19 operating on the wireless network 11 as well as data necessary to facilitate DSUP type downloading to the individual stations 19. The DSDC runs a server program to enable data communication and interactions with the mobile stations in accord with the DSUP procedures, such as those outlined herein.

The carrier also operates a number of different systems in one or more customer service centers, to support commercial operations of the network 11. These include one or more billing systems, client account administration systems, and network provisioning systems such as a Mobile Telephone Administration system or "MTAS", and the like. The billing system (not shown), for example, receives usage and operations data from the MSCs 15 and processes that data to generate bills for individual customers and to forward data regarding users roaming through the carrier s service area through a clearinghouse (not shown) for reconciliation. Typically, an MTAS provides data to a home location register (HLR) 16 in a service control point (SCP) or in the MSCs 15 to provision services for new stations 19 and modifies provisioning data as customers change their subscriptions to obtain different sets of services from the carrier. Of note for purposes of the discussion of the DSUP downloading, the carrier utilizes an MTAS 31 to provision the DSUP download center DSDC 29. The MTAS 31 is the element that interacts with the "Billing/Data Mediation" systems. For purposes of the present example, the MTAS will be the element responsible for initiation via "Interactive Mode" and processing the information to and from the "Billing/Data Mediation" Servers with regard to DSUP downloads.

Figure 3A:
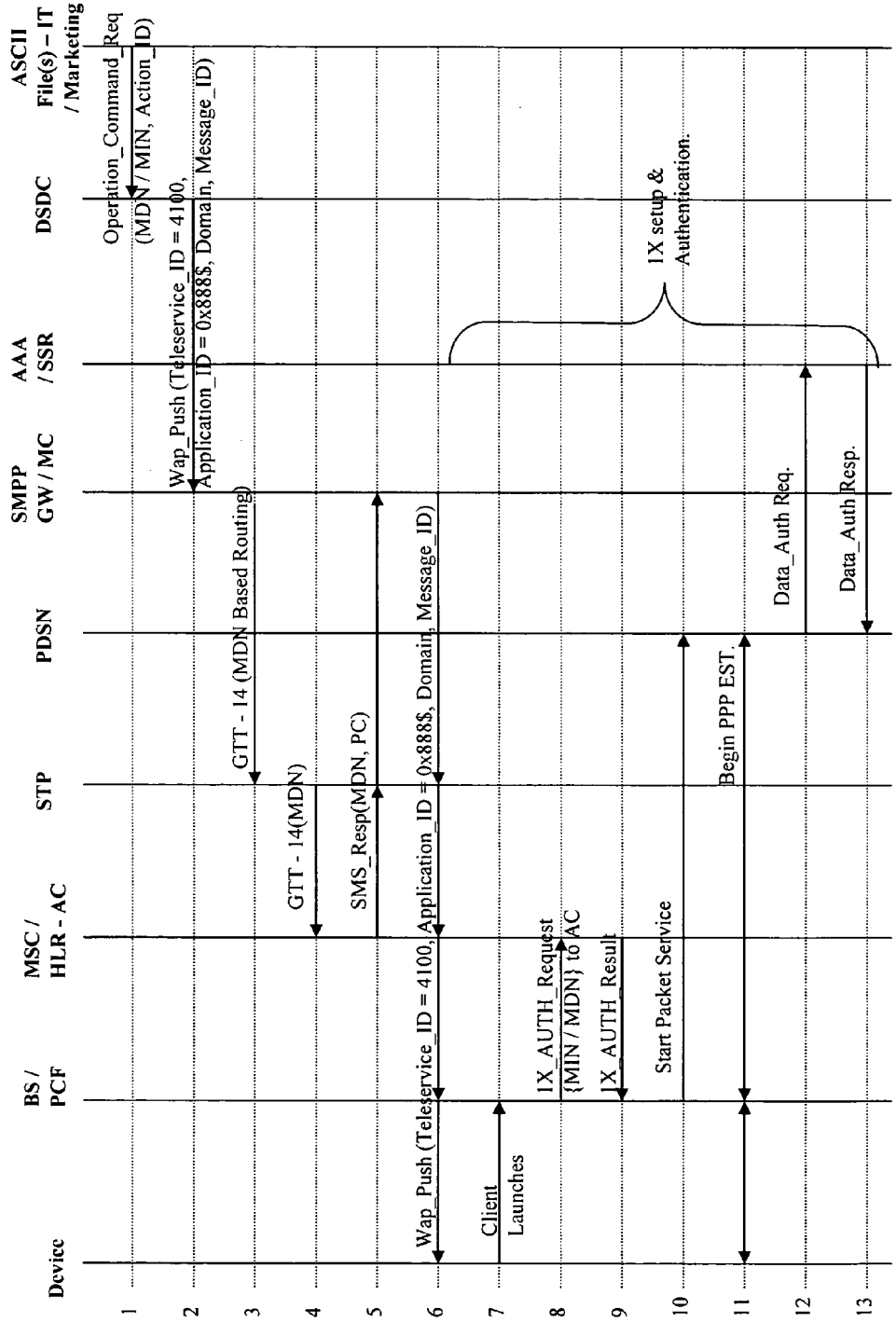
FIGS. 3a and 3b together form a call flow diagram, illustrating the signal flow in a network initiated device software download operation, from the perspective of the network architecture.
Figure 3B:
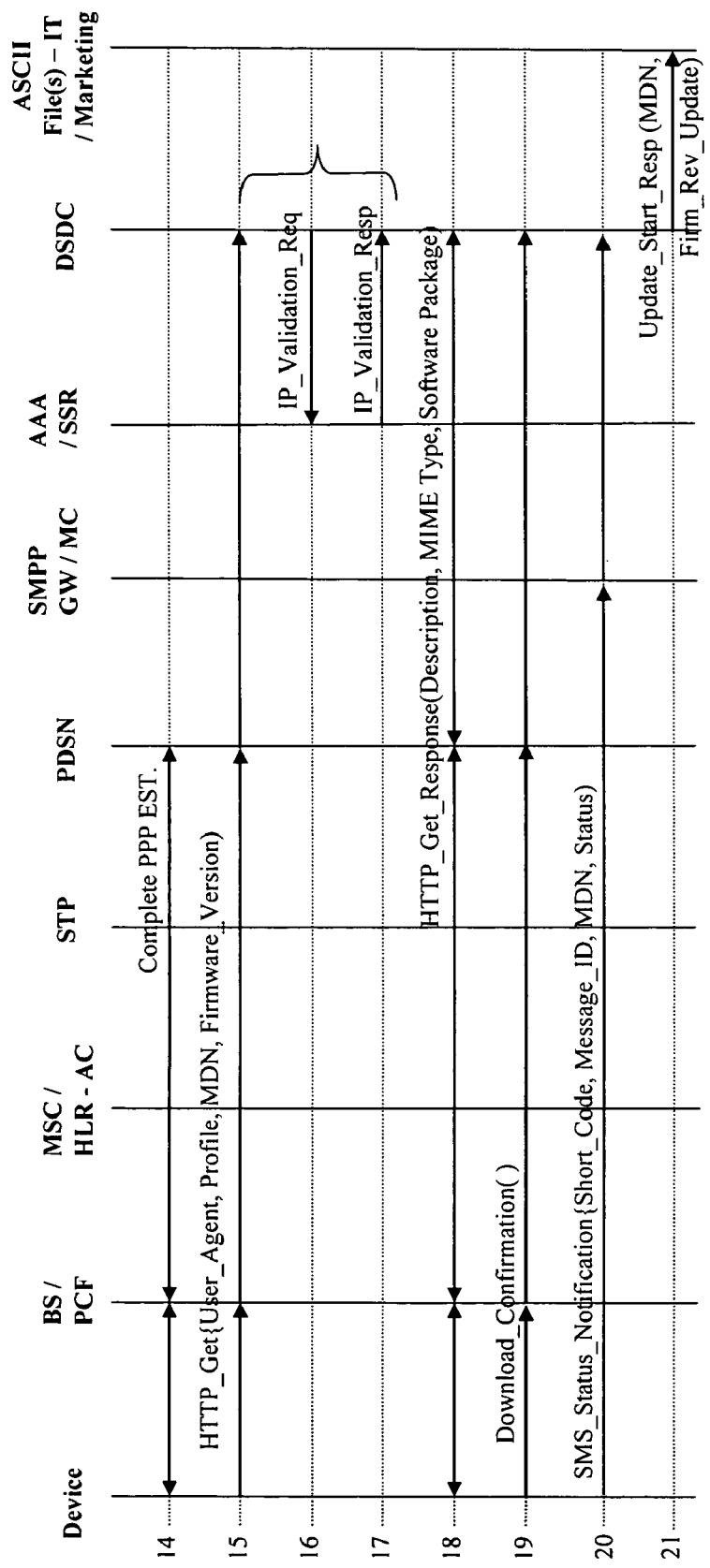

FIGS. 3a and 3b together form a signal flow diagram illustrating a process for DSUP software downloading over the air to a mobile station, with emphasis on the network perspective of the process. In this first example, the operation is initiated from the network side. Hence, in the first step in the call flow (line 1), the Operation Command is sent to the DSDC, from one of the carrier's IT systems, such as the MTAS 31 associated with operations of the DSDC 29. This Command contains the MIN/MDN of the particular mobile station 19 and an Action ID and/or an ASCII File (containing MIN/MDN's, Action ID). This data regarding the mobile station and the action to be taken (the software to be updated) is loaded into the DSDC and activated.

In the next step of the call flow (line 2), the DSDC sends a Wap_Push (containing the MMS Tele-service ID (4100), DSD Application ID (0x888$), domain name of DSDC, and Unique Message ID) through the SMPP Gateway to MC. The SMPP Gateway is the Service that relays the SMS messages from the DSUP server to the SMSC "Short Message Service Center" or also known as MC "Message Center." It should be noted that the DSD Application ID will be unique to each type of software download. For example, 0x8880 may be used for Device Software Download, 0x8881 could be used for updating a calendar, etc.

The MC is a WAP Push message sent over the SMSC link, which is also referred to as the MC message. This will be accomplished by having an SMDPP Link between the DSDC and the SMSC. Here, the MC message carries a MDN based routing (GTT #14) request to the serving STP (line 3), and the serving STP forwards the request, based on MIN to the serving HLR (line 4). *) The Type of message sent from the DSUP Server to the SMPP Gateway to the SMSC/MC is an SMS message but constructed as a WAP push message. As shown in line 5, the HLR then attempts to find the particular mobile station. If the mobile station is registered, the HLR returns the MSC information of where the mobile is located through the STP to the MC. However, if the mobile station is not registered, the HLR returns a postponed message to the MC. When the mobile station registers, the HLR sends a SMSNOT message to the MC, and the MC attempts another SMS message. The MC will queue the SMS_Wake_UP request for some configurable number of hours. After that time period, the request will expire. If the mobile station is not known to the HLR, the session is marked failed.

When the mobile station is found, the MSC receives (at line 6) the Wap-Push message from the MC with the MC service indicator parameter and an action code value for Allocate Resources. The MSC pages the mobile station and assigns mobile station to a traffic channel if not already on one. If the mobile station is idle or in a CDMA voice conversation state, the MSC sends the SMS message. Any other state of the mobile station will result in an SMS session termination. In this case, the MC session for this mobile station will be retried later.

The MMS Client is triggered by the Wap_Push message. In response, the MMS Client will request a 1x packet service connection. The Request message is sent to a base station, as shown in line 7. In response (at line 8), the base station validates the mobile station by using normal user-registration Authentication Procedures (HLR/AC-A-Key Authentication); and the HLR/AC responds to the Base Station with validation response (line 9). The AC is the Authentication Center function. It is the HLR portion/application that does the Diffey Helman computations. It is also responsible for generating public keys based on the Authentication Key of the mobile device.

The base station passes call processing to the PCF (line 10), and the PCF requests 1x connection and Authentication through the PDSN. In response, the PDSN begins secure connection to mobile station (line 11); and the PDSN requests data authentication from the AAA (line 12). The AAA sends a Data Authentication response to the PDSN (line 13). The PDSN completes secure connection to the mobile station (line 14). The mobile station responds to the Wap_Push with a HTTP_Get request containing the User-_Agent, Profile, MDN, and Firmware_Version to the DSDC (line 15), and the established session through the PSDN carries the message as packet data traffic.

In response (at line 16), the DSDC sends an IP Validation request to the Single Session Database in the AAA server. The Single Session Database sends an IP Validation response to DSDC indicating that the user is registered (line 17). Next, the DSDC determines the appropriate software package, based on the firmware version in the mobile station. The software package is downloaded at line 18, over the established 1x connection, using an HTTP Get Response (containing the MIME Type and Software Package). When complete, the mobile station sends a download confirmation, over the 1x connection, to the DSDC (line 19).

After the mobile station completes the update or cancels at the user's request, the mobile station sends an SMS Status Notification (containing the Short Code address of the DSDC, Unique Message ID, MDN, and Status) to the DSDC (line 20). In response, the DSDC generates a report (scheduled or on-demand), which is sent to MTAS-OTA with updated MDN and Firmware_Rev (line 21).

FIGS. 4a and 4b together form a signal flow diagram illustrating another process for DSUP software downloading over the air to a mobile station, with emphasis on the network perspective of the process. In this second example, the operation is initiated from the user's side. Hence, in this call flow (line 1) the SMS Notification (containing the Short Code of the DSDC, the MDN of the mobile station, and the Action to identify the appropriate software download type) is sent from the mobile station to the DSDC. The DSDC will then query the IT system to determine if it is a valid MDN of the carrier operating the service. The IT system will not respond to any MDN not listed for the service by the carrier's billing system. As illustrated in line 2, if the MDN is found, the Operation is sent to the DSDC. This Command contains the MIN/MDN and Action ID and/or an ASCII File (containing MIN/MDN's, Action ID). This data regarding the mobile station and the action to be taken (the software to be updated) is loaded into the DSDC and activated.

In the next step of the call flow (line 3), the DSDC sends a Wap_Push (containing the MMS Tele-service ID (4100), DSD Application ID (0x888$), domain name of DSDC, and Unique Message ID) through the SMPP Gateway to MC. It should be noted that the DSD Application ID will be unique to each type of software download. For example, 0x8880 may be used for Device Software Download, 0x8881 could be used for updating a calendar, etc.

The SMSC/MC sends a MDN based routing (GTT #14) request to the serving STP (line 4), and the serving STP forwards the request, based on MIN to the serving HLR (line 5). As shown in line 6, the HLR then attempts to find the particular mobile station. If the mobile is registered, the HLR returns the MSC information of where the mobile is located through the STP to the MC. However, if the mobile is not registered, the HLR returns a postponed message to the SMSC/MC. When the mobile registers, the HLR sends a SMSNOT message to the SMSC/MC, and the SMSC/MC attempts another SMS message. The SMSC/MC will queue the SMS_Wake_UP request for some configurable number of hours. After that time period, the request will expire. If the mobile is not known to the HLR, the session is marked failed.

When the mobile station is found, the MSC receives (at line 7) the Wap-Push message from the MC with the MC service indicator parameter and an action code value for Allocate Resources. The MSC pages the mobile station and assigns mobile station to a traffic channel if not already on one. If the mobile station is idle or in a CDMA voice conversation state, the MSC sends the SMS message. Any other state of the mobile station will result in an SMS session termination. In this case, the MC session for this mobile will be retried later.

The MMS Client is triggered by the Wap_Push message. In response, the MMS Client will request a 1x packet service connection. The Request message is sent to a base station, as shown in line 8. In response (at line 9), the base station validates the mobile station by using normal user-registration Authentication Procedures (HLR/AC-A-Key Authentication); and the HLR/AC responds to the base station with validation response (line 10).

The base station passes call processing to the PCF (line 11), and the PCF requests 1x connection and Authentication through the PDSN. In response, the PDSN begins secure connection to mobile station (line 12); and the PDSN requests data authentication from the AAA (line 13). The AAA sends a Data Authentication response to the PDSN (line 14). The PDSN completes secure connection to mobile station (line 15). The mobile station responds to the Wap_Push with a HTTP_Get request containing the User_Agent, Profile, MDN, and Firmware_Version through the 1x packet session to the DSDC (line 16).

In response (at line 17), the DSDC sends an IP Validation request to the Single Session Database in the AAA server. The Single Session Database sends an IP Validation response to DSDC indicating that the user is registered (line 18). Next, the DSDC determines the appropriate software package, based on the firmware version in the mobile device. The software package is downloaded at line 19, over the established 1x connection, using an HTTP Get Response (containing the MIME Type and Software Package). When complete, the mobile station sends a download confirmation, over the 1x connection, to the DSDC (line 20).

After the mobile station completes the update or cancels at the user's request, the mobile station sends an SMS Status Notification (containing the Short Code address of the DSDC, Unique Message ID, MDN, and Status) to the DSDC (line 21). In response, the DSDC generates a report (scheduled or on-demand), which is sent to MTAS-OTA with updated MDN and Firmware_Rev (line 22).

As outlined above, the mobile station 19 is a programmable device and the DSUP procedure relates to downloading of new software into such a device. Aspects of the techniques treated in more detail later, relate to the interaction of certain client software components within the mobile station 19 during the DSUP downloading process. Although it is assumed that those skilled in the art are familiar with the structure and operation of mobile stations and with general types of software utilized in such stations, it may be helpful for some readers to briefly consider a summary discussion of the station and certain elements of its software.

Figure 5:
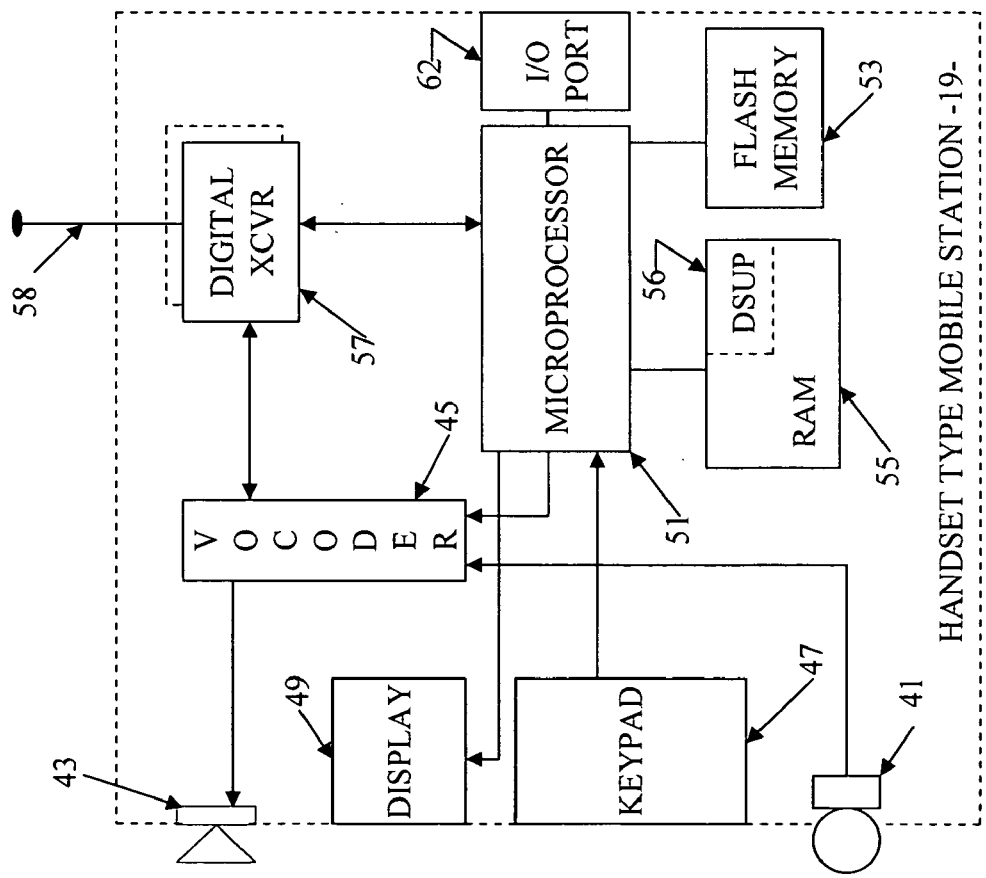
FIG. 5 is a functional block diagram of an exemplary handset implementation of a mobile station that may receive a download of a device software update.

FIG. 5 is a functional block diagram illustrating a digital telephone implementation of the mobile station 19. Although the station may be incorporated into a vehicle mounted mobile unit or into another device, such as a portable personal computer or PDA, for discussion it is assumed here that the station 19 takes the form of a portable handset.

The handset embodiment of the mobile station 19 functions as a normal digital wireless telephone station. For that function, the station 19 includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of the wireless telephone network communications.

For digital wireless communications, the handset 19 also includes a digital transceiver (XCVR) 57. The concepts discussed here encompass embodiments of the station 19 utilizing any digital transceivers that conform to current or future developed digital wireless communication standards. For example, the transceiver 57 could be an EVDO, TDMA or GSM unit designed for cellular or PCS operation. In the present embodiments, the digital transceiver 57 is a CDMA transceiver compatible with operation via a 1x network, to provide both voice and data communications.

The transceiver 57 provides two-way wireless communication of information, such as vocoded speech samples and packetized digital message information. The transceiver also sends and receives a variety of signaling messages in support of the various services provided via the station 19 and the network 3. The transceiver 57 connects through RF send and receive amplifiers (not separately shown) to an antenna 58. The station 19 may include one or more additional transceivers, as shown in dotted line form, for operation in an analog mode or in accord with an alternative digital standard.

As shown, the digital telephone handset 19 includes a display 49 for displaying messages, a menu generated by a client browser program or the like, call related information such as dialed and calling party numbers, etc. A keypad 47 enables dialing digits for voice and/or data calls and generating selection inputs keyed by the user based on the displayed menu.

A microprocessor 51 controls all operations of the handset type station 19. The microprocessor 51 is a programmable device. The mobile station 19 also includes flash type 53 and/or a non-volatile random access memory (RAM) 55, for storing various software routines and mobile configuration settings, such as mobile identification number (MIN), etc. In a present implementation, the flash memory 55 stores an operating system, vocoder software, client browser software in the form of a multimedia service (MMS) client and an SMS client, a device software update (DSU) client, additional client software, device driver software, and call processing software (see FIG. 6). This collection of software for implementing mobile station operations via the network 11 may be considered as the 'firmware' of the mobile station 19. The memories also store data, such as telephone numbers and other data input by the user via the keypad 47.

The RAM 55 serves as working memory during operation of the mobile station 19. Of note for purposes of this discussion, the mobile station 19 allocates a specified portion 56 of the RAM 55, for example, 300 KB of RAM, for the MMS Client to store the Device Software Package as it is received during the downloading operation. The allocated DSUP memory region is then used for update software installation by the DSU Client.

A cellular telephone implementation of the mobile station 19 may also include an input/output (I/O) port 62 coupled to the microprocessor 51. The I/O port 62 enables two-way exchange of data between the mobile station 19 and an external device, such as a portable computer, for example to allow the mobile station 19 to act as modem or the like for data communication services for the portable computer through the network 3.

The structure and operation of the mobile station 5, as outlined above, were described by way of example, only.

Figure 6:
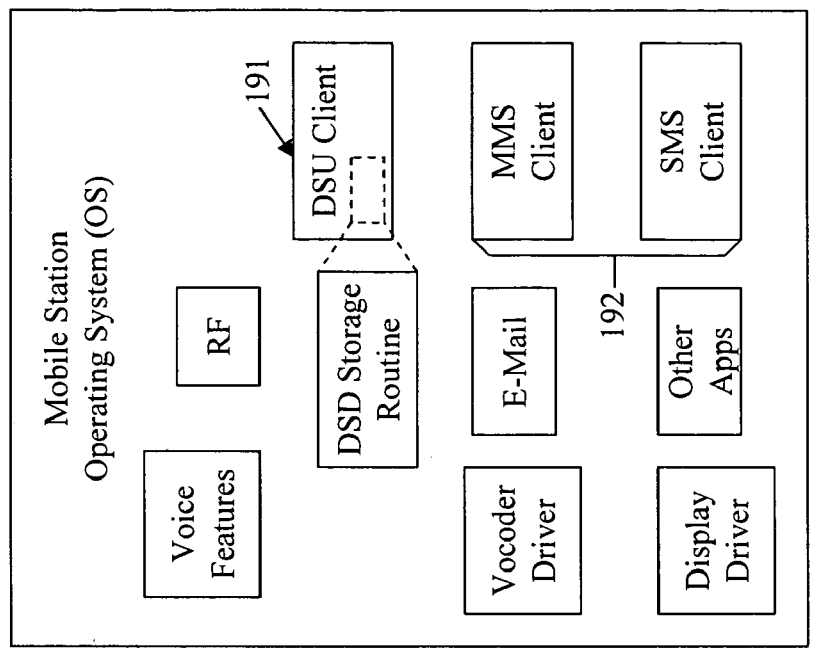
FIG. 6 is a block diagram of the software that may be downloaded to and/or resident in the mobile station.

FIG. 6 is a block diagram, useful in explaining several software components of the programming for the mobile station 19, particularly several items involved in the DSUP download processing. In the example, the programming software includes an operating system, and various software modules for implementing the basic communications functions of the mobile station 19, such as vocoder driver software, RF transceiver driver software, feature software for control of telecommunication service features, device driver software, a display driver, etc. The software includes various applications represented in the example by an e-mail application and 'other apps.' The software also includes one or more client routines for certain data communications functions. For purposes of the DSUP processing under discussion here, the client programming includes the update or 'DSU' client 191 and the data client 192. In the example, the data client 192 software includes both an MMS client and an SMS client.

The DSU Client 191 is responsible for installation of the software package, fault tolerance, and success/failure reporting to the MMS Client. The DSU client includes a DSD Storage Routine to control staging of received data into memory space dedicated to the DSUP download function and staging of data from the memory space to main storage locations allocated for storage of active software components. The mobile station 19 allocates 300 KB of RAM for the MMS Client to store the Device Software Package, which will be used for installation by the DSU Client 191. The SMS Client will be responsible for passing the message (based on Tele-service ID) to the MMS Client. The MMS Client will parse the request based on the Application ID. WAP is defined as "Wireless Application Protocol." The device does not have a WAP client per say just the ability to understand the type of message structure. The SMS message used for the present purposes is a WAP push type of message.

The DSUP downloading may provide an update of the complete software/firmware of the station 19, i.e. substantially all of the components shown in FIG. 6. The DSUP download service also can update individual software components or groups of software components.

Figure 7A:
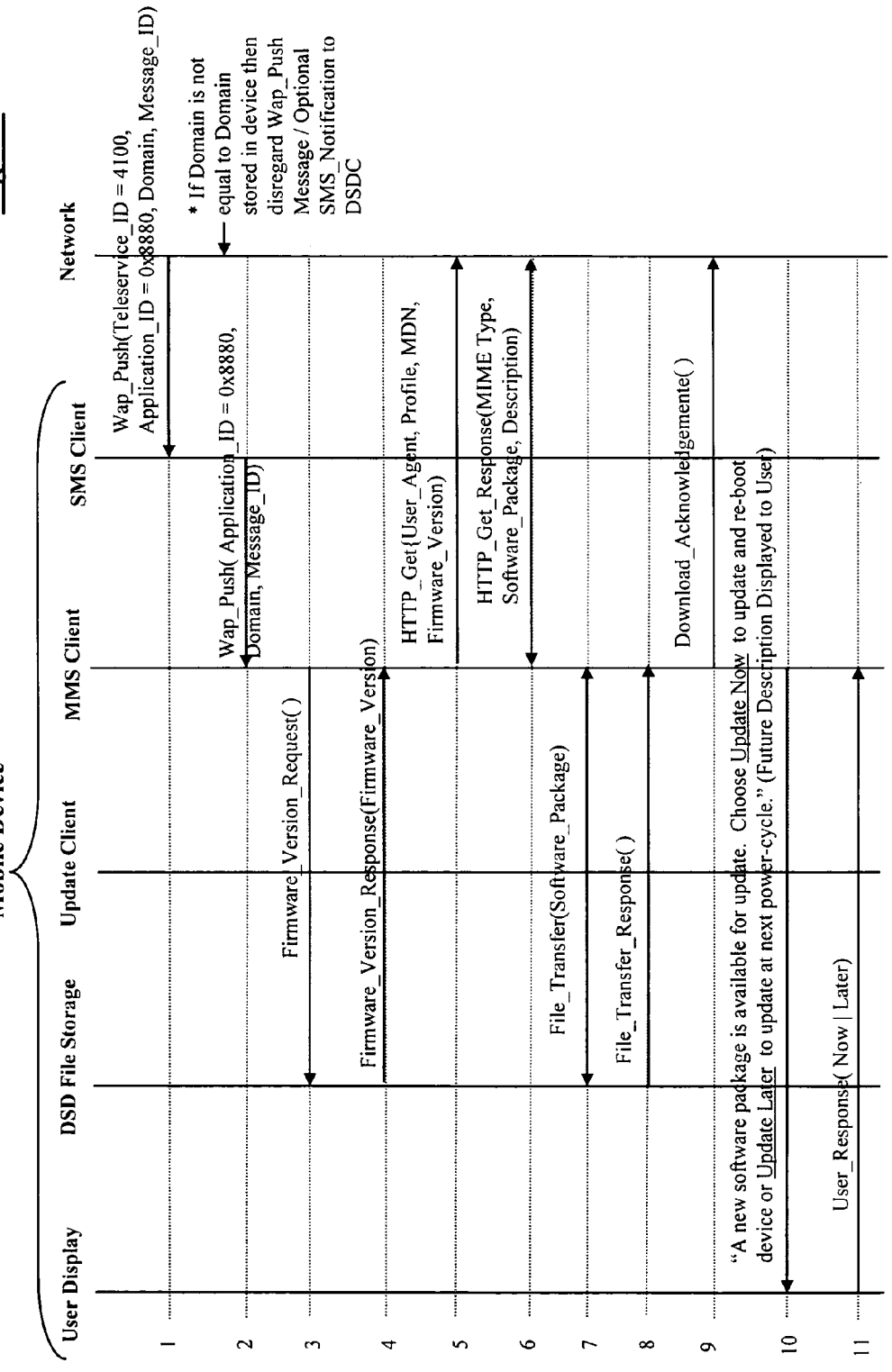
FIGS. 7a and 7b together form a call flow diagram, illustrating the signal flow in a forced device software download operation, from the perspective of the device architecture.
Figure 7B:
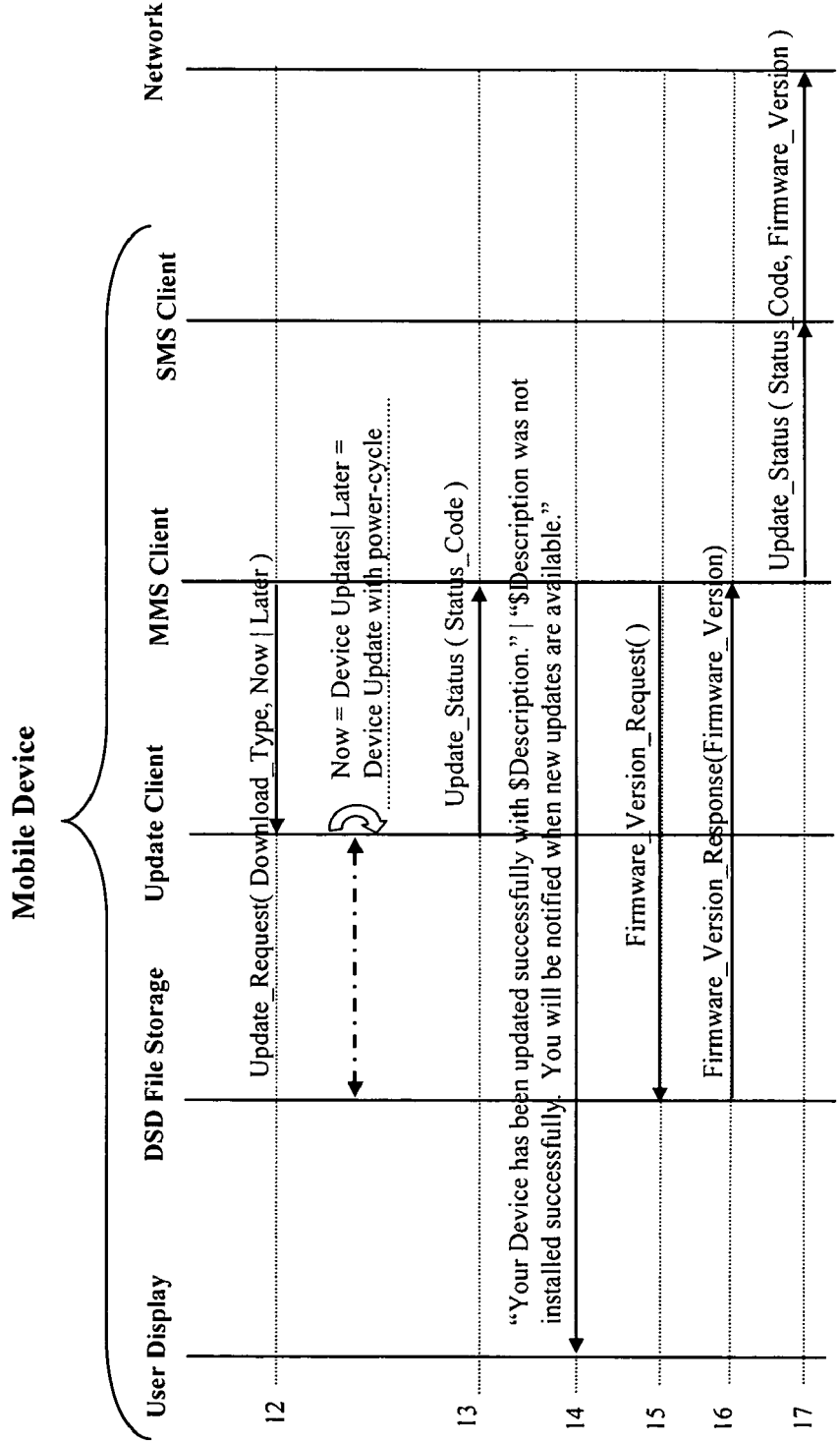

FIGS. 7a and 7b together form a signal flow diagram illustrating a process for DSUP software downloading over the air to a mobile station, with emphasis on the mobile station perspective of the process. In this first mobile station example, the network forces the download of the update software. As shown in FIGS. 7a and 7b, the DSD retrieval from the DSDC to mobile station in a Forced Download requires the following activities and support from the mobile station.

In step 1, the network, typically the DSDC, sends a Wap_Push message (containing the MMS Tele-service ID (4100), DSD Application ID (0x8880), Domain name of DSDC, and Unique Message ID) through the SMPP Gateway to MC. In the example, the DSD Application ID is 0x8880. In step 2, the SMS Client receives the Tele-service ID (4100) indicating this is a MMS message. The SMS Client sends the Application ID (0x8880), Domain, and Message ID to the MMS Client. The MMS Client determines this is a Device Software Download, based on the received Application ID. The Domain contains the instructions to the MMS Client, and the Message ID will be the transaction indicator.

In step 3, the MMS Client requests the Firmware Version from the "DSD File Storage." It should be noted that the DSD File Storage maintains the Firmware Version of the mobile station. This parameter, within the DSD File Storage, should be in sync with the mobile station's Firmware Version contained within the PRI-Settings.

In step 4, the Firmware Version is successfully obtained. Then in step 5, the MMS Client responds to the Wap_Push message with a HTTP_Get request message containing the User_Agent, Profile, MDN, and Firmware_Version. An example of this response message might contain:

GET /servlets/mms?message-id=12536 \r\n
user-agent: SonyEricssonT68/R201 A\r\n
accept: application/vnd.wap.mms-message\r\n
X-VzW-MDN: 19255960612\r\n
Host: dsdc.vzw.com\r\n
X-Vzw-FWRVersion: < > (Variable info that should always be referred from Device Firmware Version)

It should be noted that other parameters may be included in the HTTP_Get request. However, if they are not noted within this example they are transparent to the purpose of this solution.

In step 6, the DSDC determines the appropriate Software Package, based on the Firmware Version in the mobile station. The Software Package is downloaded, over the established 1x connection, using an HTTP Get Response (containing the MIME Type, Software Package, & Description-Type). It should be noted that if a description is not sent from the DSDC, a generic descriptor will be provided from the mobile station. In step 7, the MMS Client transfers the Software Package to the DSD File Storage, and at step 8, the Software Package is successfully transferred. In step 9, the MMS Client sends a Download Acknowledgement to the DSDC.

At step 10, the MMS Client prompts the User "A new Software Package $Description is available for update. Choose Update Now to update and re-boot device or Update Later to update at next power-cycle." The User Response is sent to the MMS Client, in step 11.

At step 12, the MMS Client Notifies the Update Client with the Update_Request containing the Download Type (Forced) and User Option. The Update Client will either re-boot immediately or at next power-cycle, as shown at step 13. Once this is complete a Update_Status containing the Status Code of either Success or Failure will be sent to the MMS Client In step 14, the MMS Client will prompt the user "Your Device has been updated successfully with $Description" or display "$Description was not installed successfully. You will be notified when new updates are available." In step 15, the MMS Client will request the Firmware Version from the "DSD File Storage." It should be noted that the DSD File Storage maintains the Firmware Version of the mobile station. This parameter, within the DSD File Storage, should be in sync with the mobile station's Firmware Version contained within the PRI-Settings.

At step 16, the Firmware Version is successfully obtained. Then at step 17, the MMS Client will send the SMS Status Notification to the DSDC containing the Status Code and Firmware Version.

Figure 8A:
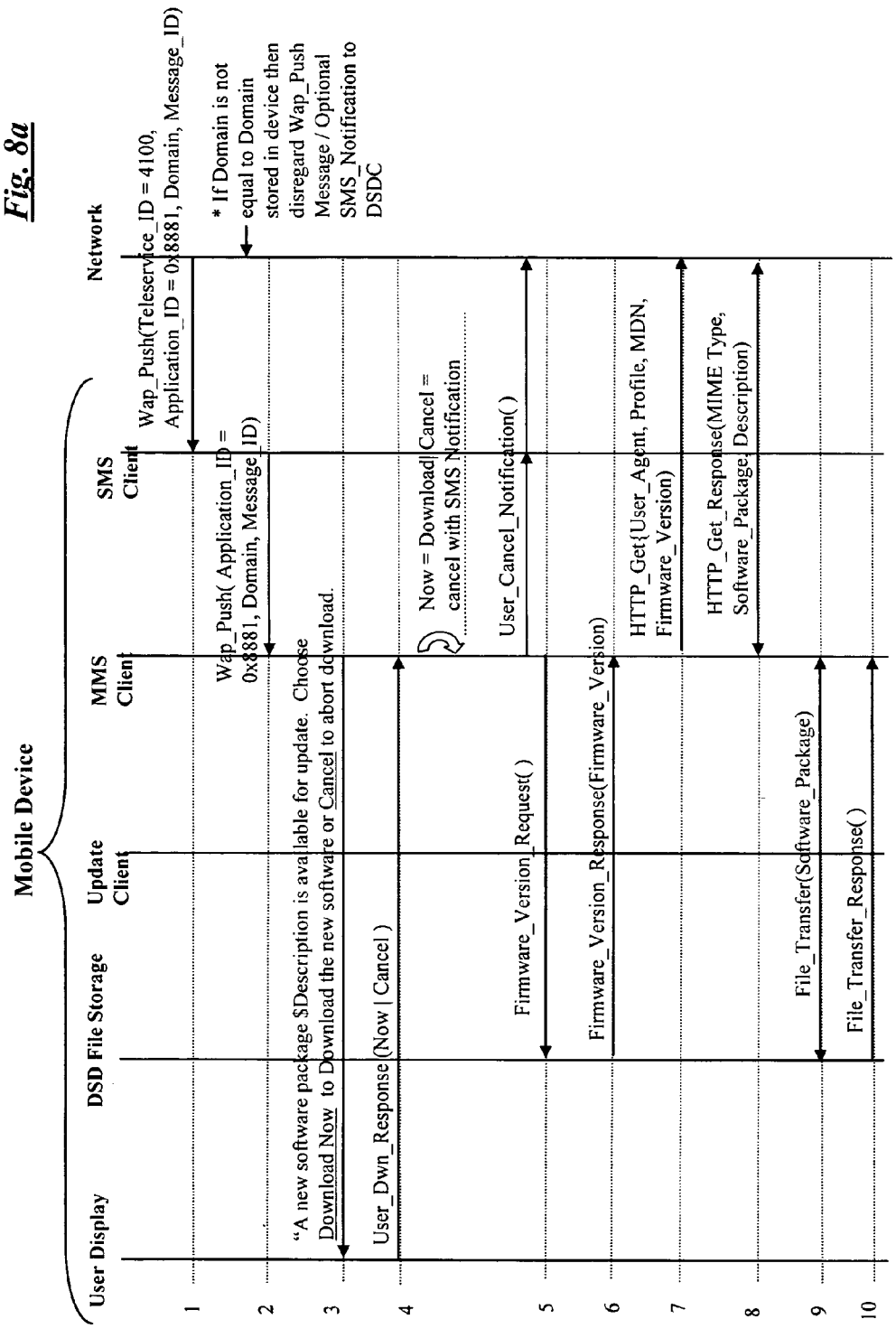
FIGS. 8a and 8b together form a call flow diagram, illustrating the signal flow in a forced notification with device software download option, from the perspective of the device architecture.
Figure 8B:
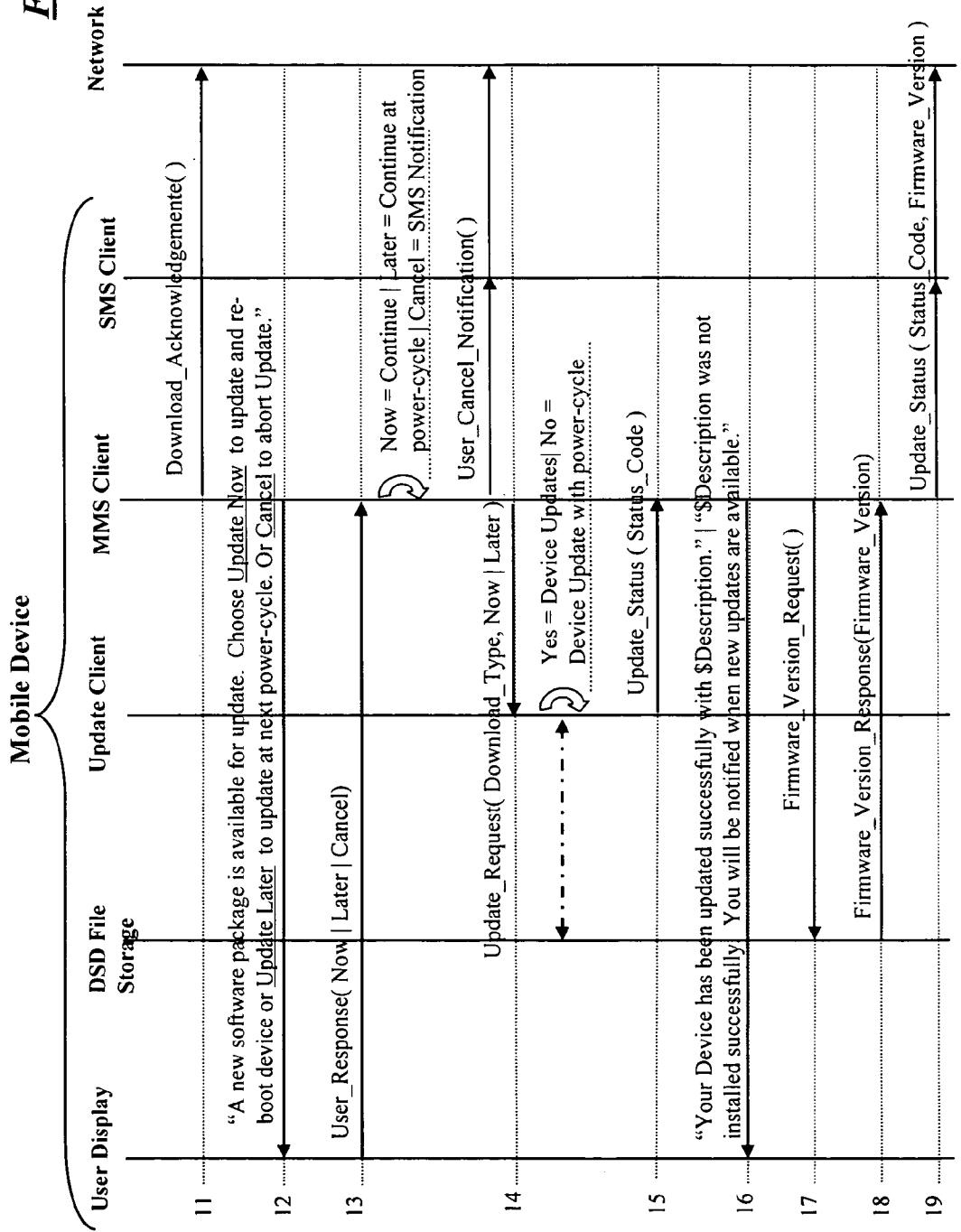

FIGS. 8a and 8b together form a signal flow diagram illustrating another process for DSUP software downloading over the air to a mobile station, with emphasis on the mobile station perspective of the process. This second device centric example entails a notification from the network, with an option for the user to accept and initiate the actual download. As shown in FIGS. 8a and 8b in the case of a Forced Notification with Download Option, the mobile station is required to support and perform the following.

In step 1, the DSDC or other network element sends a Wap_Push message (containing the MMS Tele-service ID (4100), DSD Application ID (0x8881), Domain name of DSDC, and Unique Message ID) through the SMPP Gateway to MC. In the example, the DSD Application ID is 0x8881. At step 2, the SMS Client receives the Tele-service ID (4100) indicating this is a MMS message. The SMS Client sends the Application ID (0x8881), Domain, and Message ID to the MMS Client. The MMS Client determines this is a Device Software Download, based on the received Application ID. The Domain contains the instructions to the MMS Client and the Message ID will be the transaction indicator.

In step 3, the MMS Client prompts the user "A new software package $Description is available for update. Choose Download Now to download the new software or Cancel to abort download." Then in step 4, the User Download Response is sent to the MMS Client. If "Now" is selected, processing continues to step 5, however, if "Cancel" is selected the MMS Client will generate a User Cancel Notification and send that notification to the DSDC. At step 5, the MMS Client will request the Firmware Version from the "DSD File Storage." It should be noted that the DSD File Storage maintains the Firmware Version of the mobile station. This parameter, within the DSD File Storage, should be in sync with the mobile station's Firmware Version contained within the PRI-Settings.

In step 6, the Firmware Version is successfully obtained. Then, in step 7, the MMS Client responds to the Wap_Push message with a HTTP_Get request message containing the User_Agent, Profile, MDN, and Firmware_Version. This message, for example, may contain:

GET /servlets/mms?message-id=12536 \r\n
user-agent: SonyEricssonT68/R201A\r\n
accept: application/vnd.wap.mms-message\r\n
X-VzW-MDN: 19255960612\r\n
Host: dsdc.vzw.com\r\n
X-Vzw-FWRVersion: < > (Variable info that should always be referred from Device Firmware Version)

It should be noted that other parameters may be included in the HTTP_Get request. However, if they are not noted within this example they are transparent to the purpose of this solution.

At step 8, the DSDC determines the appropriate Software Package based on the Firmware Version in mobile station. The Software Package is downloaded, over the established 1x connection, using an HTTP Get Response (containing the MIME Type, Software Package, & Description-Type). It should be noted that if a Description is not sent from the DSDC a generic descriptor will be provided from the mobile station.

In step 9, the MMS Client transfers the Software Package to the DSD File Storage. The Software Package is successfully transferred, at step 10. In step 11, the MMS Client sends a Download Acknowledgement to the DSDC. Then, at step 12, the MMS Client prompts the User "A new Software Package $Description is available for update. Choose Update Now to update and re-boot device, Update Later to update at next power-cycle, or Cancel to abort Update."

In step 13, the User Response is sent to the MMS Client. If "Update Now" or "Update Later" is selected, processing continues to step 14, however, if "Cancel" is selected the MMS Client will generate a User Cancel Notification and send to the DSDC. At step 14, the MMS Client Notifies the Update Client with the Update Request containing the Download Type (Forced w/ Option) and User Option. The Update Client will either re-boot immediately or at next power-cycle (step 15). Once this is complete a Update_Status containing the Status Code of either Success or Failure will be sent to the MMS Client.

In step 16, the MMS Client prompts the user "Your Device has been updated successfully with $Description" or displays "$Description was not installed successfully. You will be notified when new updates are available." Then at step 17, the MMS Client will request the Firmware Version from the "DSD File Storage." It should be noted that the DSD File Storage maintains the Firmware Version of the mobile station. This parameter, within the DSD File Storage, should be in sync with the mobile station's Firmware Version contained within the PRI-Settings.

In step 18, the Firmware Version is successfully obtained. The MMS Client will send SMS Status Notification to the DSDC containing the Status Code and Firmware Version (step 19).

Figure 9A:
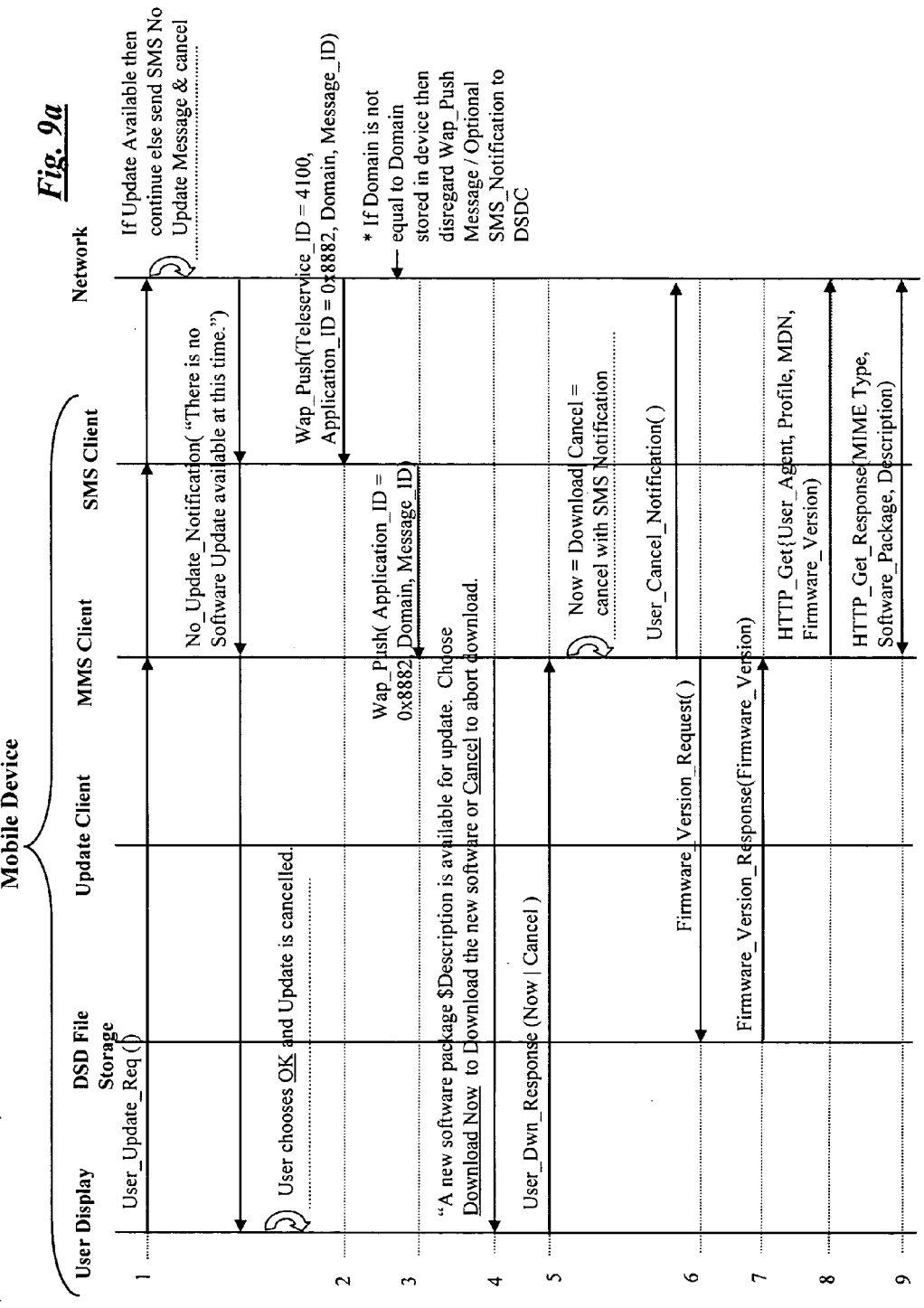

FIGS. 9a and 9b together form a signal flow diagram illustrating another process for DSUP software downloading over the air to a mobile station, with emphasis on the mobile station perspective of the process. In this third example of the mobile station procedures, the operation is initiated from the user's side. In the user initiated download mode, as shown in FIGS. 9a and 9b, the mobile station is required to support and perform the following.

At step 1, the User initiates the Software Download by means of a "soft key or equivalent." The network side, typically the DSDC, receives the notification and determines if an Update is available. If an Update is available, processing continues to step 2, however, if there is no Update available the DSDC will send a No Update Notification to the mobile station with the following text to be prompted to the User "There is no Software Update available at this time." In step 2, the DSDC sends a Wap_Push message (containing the MMS Tele-service ID (4100), DSD Application ID (0x8882), Domain name of DSDC, and Unique Message ID) through the SMPP Gateway to MC. It should be noted that in the example the DSD Application ID is 0x8882.

In step 3, the SMS Client receives the Tele-service ID (4100) indicating this is a MMS message. The SMS Client sends the Application ID (0x8882), Domain, and Message ID to the MMS Client. The MMS Client determines this is a Device Software Download based on Application ID. The Domain contains the instructions to the MMS Client and the Message ID will be the transaction indicator.

At step 4, the MMS Client prompts the user "A new software package $Description is available for update. Choose Download Now to download the new software or Cancel to abort download." Then, in step 5, the User Download Response is sent to the MMS Client. If "Now" is selected, processing continues to step 6, however, if "Cancel" is selected, then the MMS Client will generate a User Cancel Notification and send to the DSDC.

In step 6, the MMS Client will request the Firmware Version from the "DSD File Storage." It should be noted that the DSD File Storage maintains the Firmware Version of the mobile station. This parameter, within the DSD File Storage, should be in sync with the mobile station's Firmware Version contained within the PRI-Settings.

In step 7, the Firmware Version is successfully obtained. The MMS Client responds to the Wap_Push message with a HTTP_Get request message containing the User_Agent, Profile, MDN, and Firmware_Version in step 8. This response message, for example, may contain:

GET/servlets/mms?message-id=12536 \r\n
user-agent: SonyEricssonT68/R201A\r\n
accept: application/vnd.wap.mms-message\r\n
X-VzW-MDN: 19255960612\r\n
Host: dsdc.vzw.com\r\n
X-Vzw-FWRVersion: < > (Variable info that should always be referred from Device Firmware Version)

It should be noted that other parameters may be included in the HTTP_Get request. However, if they are not noted within this example they are transparent to the purpose of this solution.

In step 9, the DSDC determines the appropriate Software Package, based on Firmware Version in mobile station. The Software Package is downloaded, over the established 1x connection, using an HTTP Get Response (containing the MIME Type, Software Package, & Description-Type). It should be noted that if a Description is not sent from the DSDC, a generic descriptor will be provided from the mobile station. In step 10, the MMS Client transfers the Software Package to the DSD File Storage. Then, the Software Package is successfully transferred at step 11. Next (step 12), the MMS Client sends a Download Acknowledgement to the DSDC.

In step 13, the MMS Client prompts the User "A new Software Package $Description is available for update. Choose Update Now to update and re-boot device, Update Later to update at next power-cycle, or Cancel to abort Update." At step 14, the User Response is sent to the MMS Client. If "Update Now" or "Update Later" is selected, processing continues to step 15, however, if "Cancel" is selected the MMS Client will generate a User Cancel Notification and send it to the DSDC.

In step 15, the MMS Client Notifies the Update Client, with the Update_Request message containing the Download Type (Forced w/ Option) and User Option. Then in step 16, the Update Client will either re-boot immediately or at next power-cycle. Once this is complete, an Update_Status message containing the Status Code of either Success or Failure will be sent to the MMS Client.

At step 17 of this process, the MMS Client prompts the user "Your Device has been updated successfully with $Description" or displays "$Description was not installed successfully. You will be notified when new updates are available." Then in step 18, the MMS Client requests the Firmware Version from the "DSD File Storage." It should be noted that the DSD File Storage maintains the Firmware Version of the mobile station. This parameter, within the DSD File Storage, should be in sync with the mobile station's Firmware Version contained within the PRI-Settings. In step 19, the Firmware Version is successfully obtained. Then (step 20), the MMS Client sends an SMS Status Notification to the DSDC containing the Status Code and Firmware Version.

In the mobile station procedures outlined above, if the subscriber is on a voice call and the DSD arrives, the mobile station will show an alert screen and wait for the user to terminate the call (if set to Forced Download without alert). Once the call is completed, the mobile station will retrieve the DSD from the DSDC (if set to Forced Download without any prompt). But if the mobile station is set to Prompt Mode, then after the call is completed, the mobile station will prompt the user to retrieve the new DSD.

If an interruption in the connection occurs while transmitting/retrieving DSD related messages, the mobile station will make two automatic attempts to reestablish the connection via the 1x PPP session, to retrieve messages from the DSDC. If it is still not able to reestablish the connection, then the mobile station follows the same retry algorithm as it does for SMS messaging services. Unlike SMS, however, the DSD service proposed here follows a client-server model. Therefore in case of any interruption during the DSD submission and/or retrieval, the device/mobile station will retry to complete the successful transaction.

Aspects of the methods outlined above may be embodied in software, e.g. in the form of program code executable by computer, by one or more of the elements of the network 11 and/or by one or more of the mobile stations 19. Such software typically is carried on or otherwise embodied in a medium or media, which may be read by a computer, another type of network node, a mobile station or other type of machine. Terms such as "machine-readable medium" and "computer-readable medium" as used herein refer to any medium that participates in providing instructions and/or data to a programmable processor, such as the CPU in a computer server, in a mobile station or in any of other nodes or devices communicating through the network 11, for execution or other processing.

Figure 2:
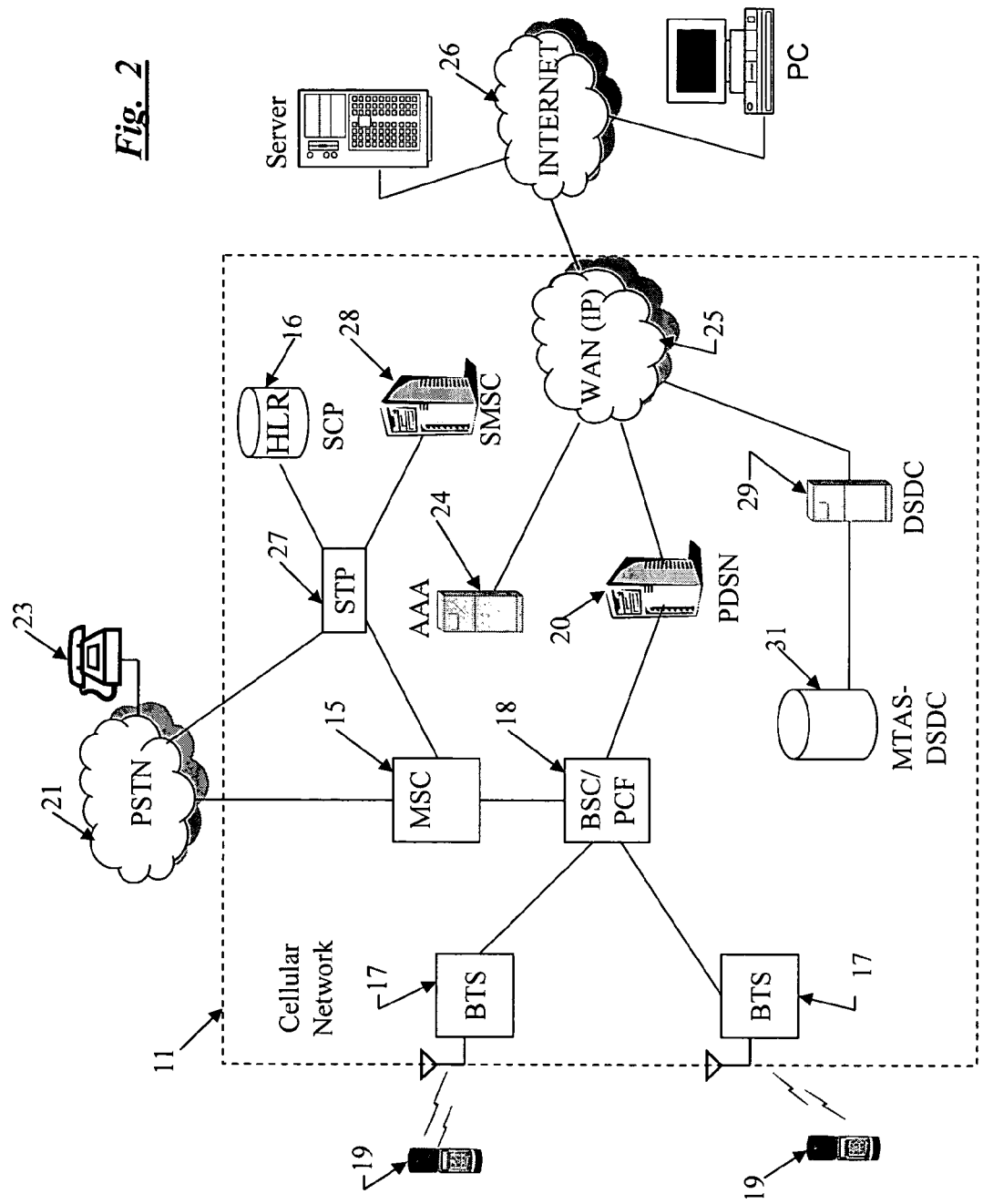
FIG. 2 is a functional block diagram of telecommunications networks and components, which may implement DSUP downloading.

Such a medium may take many forms, including but not limited to, non-volatile media, volatile media, and transmission media. Non-volatile media include, for example, optical or magnetic disks. Volatile media include dynamic memory, such as main memory or cache. Physical transmission media include coaxial cables; copper wire and fiber optics, including wired and wireless links of the networks (FIG. 2) and the wires that comprise a bus within a computer or the like. Transmission media, however, can also take the form of electric or electromagnetic signals, or acoustic or light waves such as those generated during optical, radio frequency (RF) and infrared (1R) data communications. Hence, common forms of machine-readable media include, for example, a floppy disk, a flexible disk, hard disk, magnetic tape, any other magnetic medium, a CD or CD-ROM, DVD or DVD-ROM, any other optical medium, punch cards, paper tape, any other physical medium with patterns of holes, a RAM, a ROM, a PROM, an EPROM, a FLASH EPROM, a cache memory, any other memory chip or cartridge, a carrier wave transporting data or instructions, physical links bearing such a carrier wave, or any other medium from which a computer or the like can read in order to read or recover carried information.

Various forms of such machine-readable media may be involved in carrying one or more sequences of one or more instructions to a processor for execution. For example, all or portions of the software to perform the DSUP download functions may at times be communicated through the Internet, an Intranet, the mobile wireless communication network (FIG. 2), or various other telecommunication networks or transported on disks or in portable memory. Communications of the software, for example, may serve to load relevant software from another computer (not shown) into the server operating as the DSDC 29, into a mobile station 19 or into another network element. For example, the software sent to the mobile station 19 in a DSUP download operation may include the data and update clients (191, 192), which implement many of the mobile station portions of the DSUP download methodology.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A method for downloading updated software to a mobile station over-the-air through a wireless mobile communication network, comprising:

identifying the mobile station from among stations served through the wireless mobile communication network;

sending a push notification through the wireless mobile communication network to a data communication client resident in the mobile station;

activating an update client resident in the mobile station, in response to the push notification;

initiating a data communication session from the data communication client resident in the mobile station, through the wireless mobile communication network;

sending a software identifier from the update client, indicative of software currently resident in the mobile station, via the data communication session;

selecting an update of software for the mobile station, based on the identifier;

downloading the selected update software for the mobile station to the data communication client resident in the mobile station, via the data communication session; and transferring the downloaded updated software to the update client for installation and activation thereof within the mobile station.

2. The method of claim 1, wherein:

the step of transferring comprises storing received updated software in a location in memory of the mobile station dedicated to software updating, and when downloading and storing are complete, the update client installs the downloaded updated software from the dedicated location in memory.

3. The method of claim 1, wherein the identifying of the mobile station comprises receiving a command containing identification of the mobile station from a data processing system on the network.

4. The method of claim 1, wherein the identifying of the mobile station comprises receiving a user message containing identification of the mobile station, from the mobile station, through the wireless mobile communication network.

5. The method of claim 1, wherein the data communication client comprises one or more of the following: a mobile multimedia service (MMS) client, a short message service (SMS) client and a wireless access protocol (WAP) client.

6. The method of claim 1, wherein the data communication session is a broadband packet data communication session through the wireless mobile communication network.

7. The method of claim 6, wherein the wireless mobile communication network comprises a 1x or EVDO type network.

8. A method of updating software in a mobile station over-the-air through a wireless mobile communication network, comprising:

receiving a push notification over-the-air through the wireless mobile communication network at a data communication client resident in the mobile station;

activating an update client resident in the mobile station, in response to the received push notification;

initiating a data communication session from the data communication client resident in the mobile station, over-the-air through the wireless mobile communication network;

sending a software identifier from the update client, indicative of software currently resident in the mobile station, via the data communication session;

receiving updated software for the mobile station at the data communication client resident in the mobile station, via the data communication session;

storing the received updated software in a dedicated location in memory within the mobile station;

when the storing is complete, processing the updated software in the dedicated location in memory within the mobile station with the update client, to install the updated software; and activating the installed updated software within the mobile station, to control at least one aspect of future operations of the mobile station via the network.

9. The method of claim 8, wherein the mobile station comprises a digital cellular telephone.

10. The method of claim 8, wherein the data communication session is a broadband packet data communication session through the wireless mobile communication network.

11. The method of claim 10, wherein the wireless mobile communication network comprises a 1x or EVDO type network.

12. The method of claim 8, wherein the data communication client comprises one or more of the following: a mobile multimedia service (MMS) client, a short message service (SMS) client and a wireless access protocol (WAP) client.

* * * * *